US010465719B2

(12) United States Patent
Nomura et al.

(10) Patent No.: US 10,465,719 B2
(45) Date of Patent: Nov. 5, 2019

(54) CONSTRUCTION MACHINE

(71) Applicant: Hitachi Construction Machinery Tierra Co., Ltd., Koka-shi, Shiga (JP)

(72) Inventors: Takuya Nomura, Ritto (JP); Tatsuo Takishita, Koka (JP); Masayuki Yunoue, Koka (JP); Yuta Nakamura, Koka (JP); Keisuke Sakisaka, Koka (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 337 days.

(21) Appl. No.: 15/508,174

(22) PCT Filed: Oct. 30, 2015

(86) PCT No.: PCT/JP2015/080672
§ 371 (c)(1),
(2) Date: Mar. 2, 2017

(87) PCT Pub. No.: WO2016/098462
PCT Pub. Date: Jun. 23, 2016

(65) Prior Publication Data
US 2017/0284426 A1 Oct. 5, 2017

(30) Foreign Application Priority Data
Dec. 19, 2014 (JP) ................. 2014-257496

(51) Int. Cl.
*F15B 13/01* (2006.01)
*B60R 25/24* (2013.01)
(Continued)

(52) U.S. Cl.
CPC .............. *F15B 13/01* (2013.01); *B60R 25/24* (2013.01); *B60R 25/245* (2013.01); *E02F 9/003* (2013.01);
(Continued)

(58) Field of Classification Search
CPC ............ G07C 9/00309; G07C 2209/63; G07C 2209/00357; G07C 2209/00531;
(Continued)

(56) References Cited

U.S. PATENT DOCUMENTS 6,208,239 B1 * 3/2001 Muller .................... B60R 25/24
340/10.1
2004/0030919 A1 2/2004 Moriya et al.
(Continued)

FOREIGN PATENT DOCUMENTS

JP     2-43422 A    2/1990
JP     8-301072 A   11/1996
(Continued)

OTHER PUBLICATIONS

International Search Report (PCT/ISA/220 & PCT/ISA/210) issued in PCT Application No. PCT/JP2015/080672 dated Jan. 19, 2016 with English translation (five pages).
(Continued)

*Primary Examiner* — Brian F Shaw
(74) *Attorney, Agent, or Firm* — Crowell & Moring LLP

(57) ABSTRACT

A hydraulic excavator (1) includes a wireless authentication device (52) performing wireless authentication with a portable key device (51) and a vehicle body controller (48) for starting an engine (15) based on authentication by the wireless authentication device (52) and an operation of a start switch (12). The wireless authentication device (52) transmits a request signal within an authenticable range and performs authentication when it receives an ID code for authentication replied from the portable key device (51) based on the transmitted request signal. The vehicle body controller (48) prohibits driving of a hydraulic actuator (5E, 5F, 5G, 5H, 2E, 2F, 3A) when the portable key device (51)
(Continued)

is outside of the authenticable range even if a gate lock lever (13) has been switched to an unlock position.

6 Claims, 11 Drawing Sheets

(51) Int. Cl.
| | | |
|---|---|---|
| *E02F 9/24* | (2006.01) | |
| *E02F 9/00* | (2006.01) | |
| *E02F 9/20* | (2006.01) | |
| *E02F 9/22* | (2006.01) | |
| *F02D 29/04* | (2006.01) | |
| *E02F 9/12* | (2006.01) | |

(52) U.S. Cl.
CPC .......... *E02F 9/2004* (2013.01); *E02F 9/2271* (2013.01); *E02F 9/24* (2013.01); *F02D 29/04* (2013.01); *B60R 2325/308* (2013.01); *E02F 9/125* (2013.01); *E02F 9/2058* (2013.01); *F15B 2211/20523* (2013.01)

(58) Field of Classification Search
CPC ...... G07C 2209/00984; G07C 2209/64; B60R 25/245; B60R 25/04; B60R 25/00; B60R 25/0215; B60R 25/20; H04W 12/06; H04W 4/046; G06F 2221/2111; H04L 2209/84; B60W 10/06; E02F 9/207; E02F 9/2091; E02F 9/2095; E02F 9/2246; G01S 19/53; H04B 17/27
See application file for complete search history.

(56) References Cited

U.S. PATENT DOCUMENTS

| 2013/0116892 A1* | 5/2013 | Wu | B60R 25/09 |
|---|---|---|---|
| | | | 701/45 |
| 2013/0197766 A1* | 8/2013 | Kurikuma | E02F 3/325 |
| | | | 701/50 |
| 2014/0297154 A1* | 10/2014 | Yamamoto | B60R 25/04 |
| | | | 701/99 |

FOREIGN PATENT DOCUMENTS

| JP | 11-71948 A | 3/1999 |
|---|---|---|
| JP | 2003-85267 A | 3/2003 |
| JP | 2004-116346 A | 4/2004 |
| JP | 2006-28798 A | 2/2006 |
| JP | 2010-101068 A | 5/2010 |
| JP | 2012-35722 A | 2/2012 |
| JP | 2012-132181 A | 7/2012 |
| JP | 2014-61845 A | 4/2014 |

OTHER PUBLICATIONS

Japanese-language Written Opinion (PCT/ISA/237) issued in PCT Application No. PCT/JP2015/080672 dated Jan. 19, 2016 (three pages).
Korean-language Office Action issued in counterpart Korean Application No. 10-2017-7006071 dated Jun. 11, 2018 (six pages).
Chinese-language Office Action issued in counterpart Chinese Application No. 201580048108.0 dated Feb. 15, 2019 (seven pages).
Korean-language Office Action issued in counterpart Korean Application No. 10-2017-7006071 dated Jan. 9, 2019 (seven pages).
Extended European Search Report issued in counterpart European Application No. 15869670.8 dated Aug. 16, 2018 (seven (7) pages).

* cited by examiner

Fig. 9

| CATEGORY | BASIC RANGE<br>(DURING DRIVING OPERATION) | EXTENDED RANGE<br>(SETTING OF RANGE SETTING SWITCH) |
|---|---|---|
| RANGE | ABOUT DIAMETER OF 1 m AROUND OPERATOR'S SEAT<br>(INSIDE OF CAB) | ABOUT DIAMETER OF 5 m AROUND OPERATOR'S SEAT<br>(RANGE POSSIBLE FOR MAINTENANCE WORK OUTSIDE OF VEHICLE) |

CONSTRUCTION MACHINE

TECHNICAL FIELD

The present invention relates to a construction machine such as a hydraulic excavator, a wheel loader, a hydraulic crane and the like, for example, and particularly to a construction machine including a wireless authenticating device for performing wireless authentication with a portable key device.

BACKGROUND ART

In general, in a hydraulic excavator as a typical example of the construction machine, a gate lock lever which can switch between a lock position where driving of a hydraulic actuator (a hydraulic cylinder of a working mechanism, a traveling hydraulic motor of a lower traveling structure, and a revolving hydraulic motor of an upper revolving structure, for example) is prohibited and an unlock position where the driving of the hydraulic actuator is allowed is disposed on an entranceway side to an operator's seat (Patent Document 1). The gate lock lever is operated by an operator to a raised position which is a lock position and to a lowered position which is an unlock position.

When an operator gets on the operator's seat of the hydraulic excavator or gets off the operator's seat, for example, the gate lock lever is operated to be raised to the lock position (raised position). On the other hand, when the operator operates the hydraulic excavator on the operator's seat, the gate lock lever is operated to be lowered to the unlock position (lowered position). Here, a gate lock switch is provided in the gate lock lever.

When the gate lock lever is operated to the lock position, the gate lock switch is turned OFF, and a valve device for switching supply/discharge of a pressurized oil to a pilot operation system is switched to a shut-off position (discharge position). In this case, stop of the hydraulic actuator is maintained, and an operation of the working mechanism, a revolving operation of the upper revolving structure, and a traveling operation of the lower traveling structure are disabled. On the other hand, when the gate lock lever is operated to the unlock position, the gate lock switch is turned ON, and the valve device is switched to a supply position. In this case, the hydraulic actuator is driven in accordance with the operation by the operator, and the operation of the working mechanism, the revolving operation of the upper revolving structure, and the traveling operation of the lower traveling structure are enabled.

PRIOR ART DOCUMENT

Patent Document

Patent Document 1: Japanese Patent Laid-Open No. 2006-28798 A

SUMMARY OF THE INVENTION

Incidentally, according to the conventional art, when the operator leaves the hydraulic excavator while keeping an engine driven, a person other than the operator might operate the hydraulic excavator. That is, even if the person other than the operator gets on the hydraulic excavator with the engine being driven and lowers the gate lock lever to the unlock position, driving of the hydraulic actuator is allowed. At this time, if the person touches an operating lever, there is a concern that the hydraulic excavator moves.

The present invention was made in view of the aforementioned problem of the conventional art and has an object to provide a construction machine which can suppress the operation by the person other than the operator even if a prime mover is being driven.

A construction machine of the present invention includes a vehicle body having an operator's seat; a prime mover which is provided on the vehicle body and becomes a power source; a hydraulic pump driven by the prime mover and supplying a pressurized oil; a hydraulic actuator driven by the pressurized oil supplied from the hydraulic pump; and a lock device capable of switching between a lock position prohibiting the driving of the hydraulic actuator and an unlock position allowing the driving of the hydraulic actuator, wherein a work is performed by the driving of the hydraulic actuator in a state where the lock device is switched to the unlock position.

In order to solve the aforementioned problem, a characteristic of a configuration adopted by the present invention includes a start switch for starting the prime mover; a wireless authentication device provided on the vehicle body and performing wireless authentication with a portable key device; and a vehicle body controller provided for starting the prime mover based on an operation of the start switch and authentication by the wireless authentication device; and when the lock device is switched to the unlock position for allowing driving of the hydraulic actuator, in the case where the portable key device is within an authenticable range of the wireless authentication device, the vehicle body controller allows driving of the hydraulic actuator, while in the case where the portable key device is outside of the authenticable range of the wireless authentication device, the vehicle body controller prohibits driving of the hydraulic actuator.

Effect of the Invention

According to the present invention, even during the driving of the prime mover, operation of the construction machine by a person other than the operator can be suppressed in the case where the operator holds the portable key device.

BRIEF DESCRIPTION OF THE DRAWINGS

FIG. 9 is an explanatory view showing an example of setting of the authenticable range as a list.

MODE FOR CARRYING OUT THE INVENTION

Hereinafter, an embodiment of a construction machine according to the present invention will be described in detail by referring to the attached drawings by using a case applied to a small-sized hydraulic excavator called a mini excavator as an example.

FIG. 1 to FIG. 9 show the embodiment.

Figure 1:
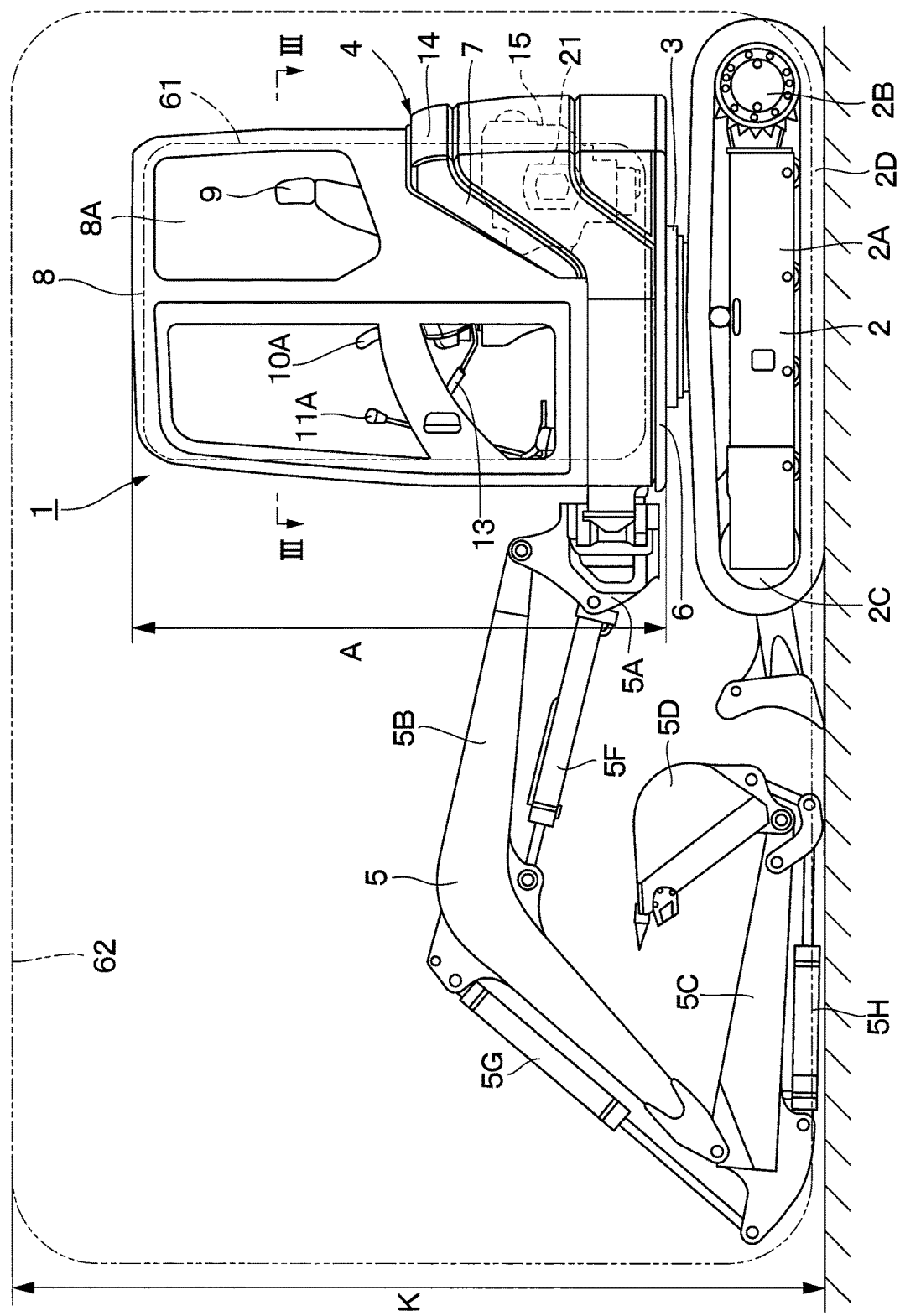
FIG. 1 is a front view showing a small-sized hydraulic excavator according to the embodiment.

In FIG. 1, a hydraulic excavator 1 as a construction machine is a small-sized hydraulic excavator called a mini excavator suitable for a work in a small work site. The hydraulic excavator 1 is constituted by including an automotive crawler-type lower traveling structure 2, an upper revolving structure 4 rotatably mounted on the lower traveling structure 2 through a revolving device 3, and a working mechanism 5 mounted on a front side of the upper revolving structure 4, capable of moving upward and downward. The hydraulic excavator 1 performs an excavating work of earth and sand by using the working mechanism 5. Here, the lower traveling structure 2 and the upper revolving structure 4 constitute a vehicle body of the hydraulic excavator 1. Since the small-sized hydraulic excavator 1 is used in a demolishing work of an inside of a building, the excavating work in a small place such as in a street and the like, a machine weight is kept to approximately 0.8 to 8 tons, for example.

The lower traveling structure 2 is constituted by a truck frame 2A, driving wheels 2B provided on both left and right sides of the truck frame 2A, idler wheels 2C provided on the both left and right sides of the truck frame 2A and on sides opposite to the driving wheels 2B in a front-rear direction, and a crawler belt 2D wound around the driving wheel 2B and the idler wheel 2C. The left and right driving wheels 2B are rotated/driven by left and right traveling hydraulic motors 2E and 2F (see FIG. 4) as hydraulic actuators, respectively.

The working mechanism 5 is constituted as a swing-post type working mechanism, for example. The working mechanism 5 includes a swing post 5A, a boom 5B, an arm 5C, and a bucket 5D as a work tool. In addition, the working mechanism 5 includes a swing cylinder 5E (see FIG. 2) for causing the swing post 5A (and thus, the entire working mechanism 5) to swing left and right, a boom cylinder 5F for rotating the boom 5B, an arm cylinder 5G for rotating the arm 5C, and a bucket cylinder 5H as a work tool cylinder for rotating the bucket 5D. The swing cylinder 5E, the boom cylinder 5F, the arm cylinder 5G, and the bucket cylinder 5H constitute hydraulic actuators driven by pressurized oil, respectively.

On the other hand, the upper revolving structure 4 is mounted on the lower traveling structure 2 through the revolving device 3 constituted by including a revolving hydraulic motor 3A (see FIG. 4) as the hydraulic actuator, a speed reducing mechanism, and a revolving bearing. The upper revolving structure 4 is revolved/driven by the revolving hydraulic motor 3A of the revolving device 3 with respect to the lower traveling structure 2. Here, the upper revolving structure 4 is constituted by including a revolving frame 6, an exterior cover 7, a cab 8, and a counterweight 14 which will be described later.

The revolving frame 6 is a frame forming a support structural body of the upper revolving structure 4, and the revolving frame 6 is mounted on the lower traveling structure 2 through the revolving device 3. The counterweight 14 and an engine 15 which will be described later are provided on a rear part side of the revolving frame 6, the cab 8 which will be described later is provided on a front left side, and a fuel tank (not shown) and a hydraulic oil tank 22 (see FIG. 4) are provided on a front right side. The exterior cover 7 is provided on the revolving frame 6, from the right side of the cab 8 to the rear side and left and right side surface sides. The exterior cover 7 defines a machine room accommodating the engine 15, a hydraulic pump 21, a heat exchanger (not shown) and the like together with the revolving frame 6, the cab 8, and the counterweight 14.

The cab 8 is mounted on the front left side of the revolving frame 6, and an inside of the cab 8 forms an operator's room 8A which an operator (driver) gets onboard. An operator's seat 9 on which the operator is seated (sits) is provided in the inside of the cab 8. The operator's seat 9 is covered by the cab 8 as a housing on an upper part. Here, operating levers 10A and 10B for work for operating the working mechanism 5 are provided on both left and right sides of the operator's seat 9.

The operating levers 10A and 10B are performed moving operation in a front-rear direction and in a left-right direction by the operator. In this case, the operating lever 10A on the left side is for revolving the upper revolving structure 4 or for rotating the arm 5C of the working mechanism 5, for example, while the operating lever 10B on the right side is for moving upward and downward the boom 5B of the working mechanism 5 or for rotating the bucket 5D, for example.

Operating levers/pedals 11A and 11B for traveling operated by a manual operation or by a stepping-on operation when the lower traveling structure 2 is made to run are provided on a front of the operator's seat 9. The operating levers/pedals 11A and 11B are performed moving operation in the front-rear direction by the operator for advancing, reversing and turning to a right or a left direction of the vehicle body.

Figure 5:
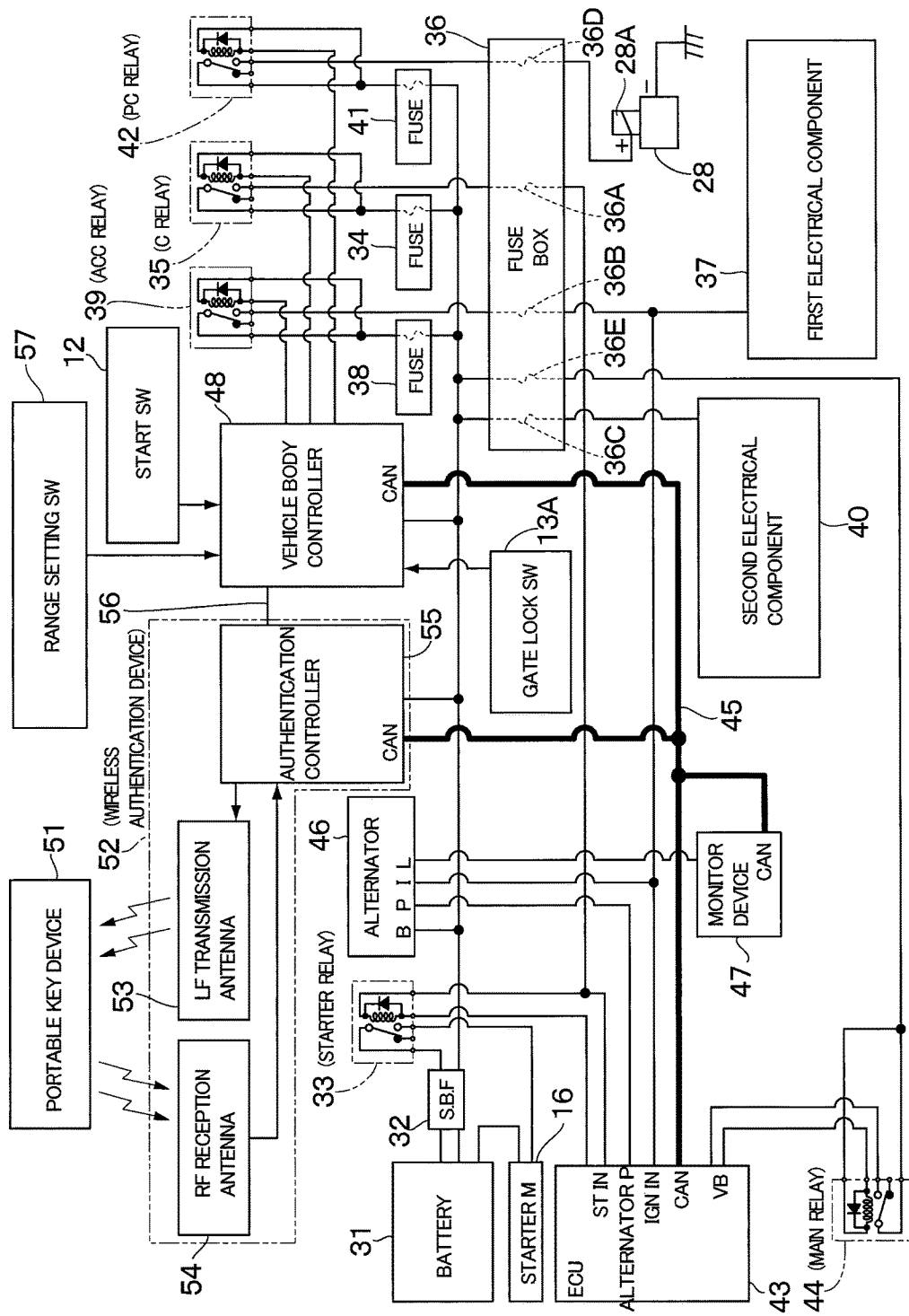
FIG. 5 is an electric circuit configuration diagram of the hydraulic excavator.

A start switch 12 is provided in the vicinity of the operator's seat 9 or more specifically, on a rear side of the right operating lever 10B on the right side of the operator's seat 9. The start switch 12 is a main switch for starting the engine 15. The start switch 12 is constituted by a push-type switch, for example. The start switch 12 is operated by the operator. As shown in FIG. 5, the start switch 12 is connected to a vehicle body controller 48 which will be described later. When the start switch 12 is operated by the operator, the start switch 12 outputs a signal (ON signal) indicating conduction to the vehicle body controller 48. The operator can start, stop or the like of the engine 15 which will be described later by seating on the operator's seat 9 and operating the start switch 12.

On the other hand, on the left side of the operator's seat 9 or more specifically, a gate lock lever 13 is provided on a lower side of the left-side work operating lever 10 and at a position corresponding to an entrance way of the cab 8. The gate lock lever 13 constitutes a lock device together with a gate lock switch 13A which will be described later. The gate lock lever 13 is rotated between a boarding restricted position (hereinafter referred to as an unlock position) shutting off the entrance way of the cab 8 and a boarding allowed position (hereinafter referred to as a lock position) opening the entrance way. Here, the unlock position which shuts off the entrance way corresponds to a state where the gate lock lever 13 is lowered, while the lock position opening the entrance way corresponds to a state where the gate lock lever 13 is raised. The gate lock lever 13 in the lowered state (unlock position) is shown in FIG. 1.

The gate lock lever 13 is switched by an operation by the operator between the lock position (raised position) and the unlock position (lowered position). In this case, when the gate lock lever 13 is set to the lock position, the hydraulic actuator of the hydraulic excavator 1, that is, driving of various hydraulic actuators such as each of the cylinders 5E, 5F, 5G and 5H, the traveling hydraulic motors 2E and 2F, the revolving hydraulic motor 3A and the like is prohibited. On the other hand, when the gate lock lever 13 is set to the unlock position, driving of the hydraulic actuators is allowed.

Here, the gate lock switch 13A (see FIG. 5) is provided in the gate lock lever 13. The gate lock switch 13A is a detection switch for detecting a position of the gate lock lever 13. As shown in FIG. 5, the gate lock switch 13A is connected to the vehicle body controller 48 which will be described later. The vehicle body controller 48 can determine whether the gate lock lever 13 is at the lock position or at the unlock position based on a detection signal (ON/OFF signal) of the gate lock switch 13A. In this case, the gate lock switch 13A can be constituted as a normally-open switch (a switch urged by a spring to an open position) which is in a non-conducted (OFF) state when the gate lock lever 13 is at the lock position and in a conducted (ON) state when the gate lock lever 13 is at the unlock position, for example.

Moreover, as shown in FIG. 5, the vehicle body controller 48 is connected to a pilot cut relay 42 (hereinafter referred to as the PC relay 42) which will be described later. In this case, a battery 31 and a pilot pressure switching valve 28 which will be described later are connected through the PC relay 42.

Figure 4:
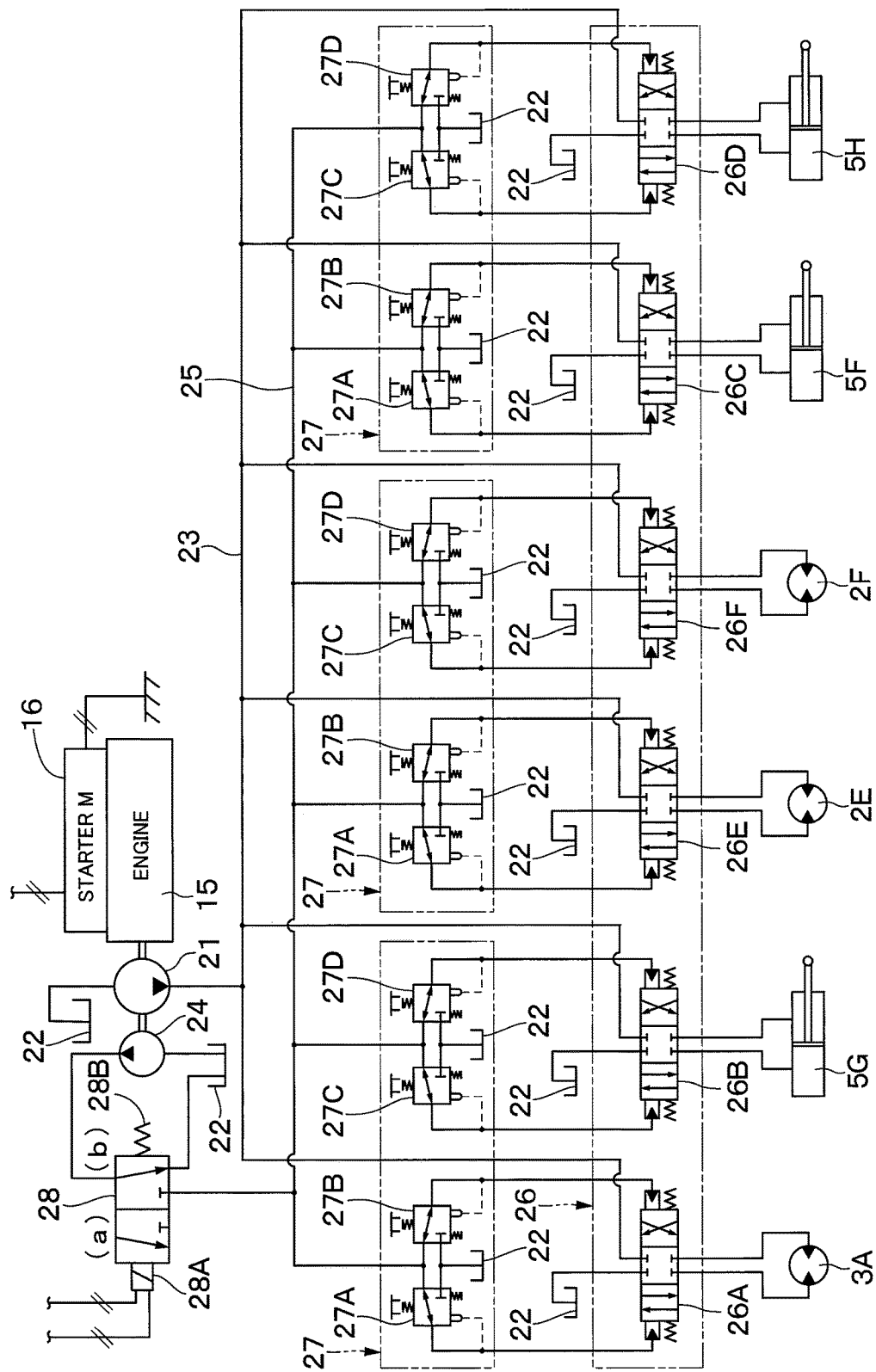
FIG. 4 is a hydraulic circuit configuration diagram of the hydraulic excavator.

When the gate lock lever 13 is set to the lock position, a pilot pressure (switching signal) for switching a control valve device 26 (control valves 26A to 26F) shown in FIG. 4, is shut off, and the control valve device 26 is maintained at a neutral position as will be described later. As a result, the pressurized oil delivered from the hydraulic pump 21 is not supplied to the hydraulic actuator but returns to a hydraulic oil tank 22, and the driving of the hydraulic actuator is prohibited.

On the other hand, when the gate lock lever 13 is set to the unlock position, the pilot pressure can be supplied to the control valve device 26 (control valves 26A to 26F) through the operating levers 10A and 10B for work and the operating levers/pedals 11A and 11B for traveling. In this case, based on the operation of the operating levers 10A and 10B and the operating levers/pedals 11A and 11B for traveling by the operator, the control valve device 26 is switched, and driving of the hydraulic actuator is allowed. As described above, the hydraulic excavator 1 performs a work by driving of the hydraulic actuator in the state where the gate lock lever 13 is switched to the unlock position.

The counterweight 14 is to take a weight balance with the working mechanism 5. The counterweight 14 is located on a rear side of the engine 15 which will be described later and mounted on a rear end portion of the revolving frame 6. A rear surface side of the counterweight 14 is formed having an arc shape. The counterweight 14 has constitution accommodated in a vehicle width of the lower traveling structure 2. Accordingly, the hydraulic excavator 1 constitutes a rear-small-revolving type mini excavator.

The engine 15 as a motor is provided on the upper revolving structure 4. Specifically, the engine 15 is disposed in a lateral state on a rear side of the revolving frame 6 constituting the upper revolving structure 4. The engine 15 is constituted by using a small-sized diesel engine, for example, and becomes a power source for the hydraulic pump 21 which will be described later. Here, the engine 15 is constituted by an electronically controlled type engine and its fuel supply amount is variably controlled by a fuel injection device including an electronically controlled injection valve (injector), for example. That is, the fuel injection device variably controls a fuel injection amount injected into a cylinder of the engine 15 based on a control signal output from an engine control unit 43 (see FIG. 5) called ECU which will be described later.

As shown in FIGS. 4 and 5, a starter motor 16 is provided in the engine 15. The starter motor 16 is an electrical component (auxiliary machine) of the engine 15, that is, electric equipment of the engine 15. The starter motor 16 is connected to the battery 31 through a starter relay 33 and the like which will be described later. The starter motor 16 is to rotate a crank shaft of the engine 15 when the engine 15 is to be started. That is, when the starter relay 33 is turned ON (closed), the starter motor 16 is rotated based on power feed from the battery 31, and the engine 15 can be started. When the engine 15 is started, the starter relay 33 is turned OFF (opened), and the starter motor 16 is stopped.

Next, constitution of a hydraulic circuit of the hydraulic excavator 1 will be described by referring to FIG. 4. It should be noted that in FIG. 4, the hydraulic circuit relating to the swing cylinder 5E is omitted in the illustration.

The hydraulic pump 21 is mounted on a left side of the engine 15. The hydraulic pump 21 constitutes a hydraulic source together with the hydraulic oil tank 22. That is, the hydraulic pump 21 suctions the hydraulic oil from the hydraulic oil tank 22 by being driven by the engine 15 and supplies the suctioned hydraulic oil to the control valve device 26 through a main line 23. The hydraulic pump 21 is constituted by a variable displacement type, namely swash-plate type, an inclined shaft type or a radial piston type hydraulic pump, for example. It should be noted that the hydraulic pump 21 is not necessarily limited to the variable displacement type hydraulic pump but may be constituted by using a fixed displacement type hydraulic pump, for example.

A pilot hydraulic pump 24 is a pilot hydraulic source and supplies a pilot pressure to a pilot line 25. In the middle of the pilot line 25, the pilot pressure switching valve 28 is provided.

The control valve device 26 is constituted as a collective body of the control valves 26A to 26F and is connected to a delivery side of the hydraulic pump 21 by the main line 23. Each of the control valves 26A to 26F is constituted by a spool valve and the like of a hydraulic pilot type, for example. The control valve device 26 (control valves 26A to 26F) is switched in accordance with a pilot pressure based on the operation of the operating levers 10A and 10B for work and the operating levers/pedals 11A and 11B for traveling, that is, a pilot pressure input from each of hydraulic pilot valves 27 which will be described later to a hydraulic pilot portion. As a result, the control valve device 26 selectively supplies or discharges the pressurized oil delivered from the hydraulic pump 21 to various hydraulic actuators including each of the cylinders 5E, 5F, 5G, and 5H, the traveling hydraulic motors 2E and 2F, and the revolving hydraulic motor 3A.

Here, as shown in FIG. 4, the control valve device 26 is constituted by a revolving control valve 26A for controlling the revolving hydraulic motor 3A of the revolving device, the arm control valve 26B, the boom control valve 26C, the bucket control valve 26D for controlling the arm cylinder 5G, the boom cylinder 5F and the bucket cylinder 5H of the working mechanism 5, respectively, the left traveling control valve 26E and the right traveling control valve 26F for controlling the traveling hydraulic motors 2E and 2F of the lower traveling structure 2, respectively.

A plurality of the hydraulic pilot valves 27 is connected to the hydraulic pilot portions of the control valves 26A to 26F. Each of the hydraulic pilot valves 27 is constituted by four pressure reducing valves 27A to 27D, for example. Here, the hydraulic pilot valve 27 located on the left side in FIG. 4, for example, is connected to the left-side operating lever 10A and is connected to the revolving control valve 26A and the arm control valve 26B.

When the left-side operating lever 10A is performed moving operation to the front-rear direction or to the left-right direction, for example, the pilot pressure according to an operation amount of the lever is output from the left-side hydraulic pilot valve 27 to the revolving control valve 26A or to the arm control valve 26B, and the applicable control valves 26A and 26B are switched. As a result, revolving of the upper revolving structure 4 or upward and downward movement of the arm 5C can be performed.

On the other hand, the hydraulic pilot valve 27 located on the right side is connected to the right-side operating lever 10B and is connected to the boom control valve 26C and the bucket control valve 26D. When the right-side operating lever 10B is performed moving operation, the boom control valve 26C or the bucket control valve 26D is switched by the right-side hydraulic pilot valve 27, whereby the boom 5B or the bucket 5D can be operated.

Moreover, the central hydraulic pilot valve 27 is connected to the left and right operating levers/pedals 11A and 11B and is connected to the left traveling control valve 26E and the right traveling control valve 26F, respectively. When the operating levers/pedals 11A and 11B are performed moving operation, the left traveling control valve 26E or the right traveling control valve 26F is switched by the central hydraulic pilot valve 27, whereby the vehicle can be made to run.

The pilot pressure switching valve 28 is also called a pilot cut solenoid valve. The pilot pressure switching valve 28 is openably and closably provided between the pilot hydraulic pump 24 and the hydraulic pilot valve 27 in the middle of the pilot line 25. The pilot pressure switching valve 28 switches between allowance and prohibition of supply of the pilot pressure to the control valve device 26 (control valves 26A to 26F), that is, conduction and shut-off of the pilot pressure oil.

Here, the pilot pressure switching valve 28 allows driving of the hydraulic actuators 5E, 5F, 5G, 5H, 2E, 2F, and 3A when the gate lock lever 13 is at the unlock position. On the other hand, the pilot pressure switching valve 28 prohibits driving of the hydraulic actuators 5E, 5F, 5G, 5H, 2E, 2F, and 3A when the gate lock lever 13 is at the lock position. Moreover, as described later, the pilot pressure switching valve 28 prohibits driving of the hydraulic actuators 5E, 5F, 5G, 5H, 2E, 2F, and 3A when the portable key device 51 is outside of an authenticable range of the wireless authentication device 52 even if the gate lock lever 13 is at the unlock position.

As shown in FIG. 4, the pilot pressure switching valve 28 is constituted by an electromagnetic pilot type 3-port 2-position switching valve, for example. As shown in FIG. 4 and FIG. 5, the pilot pressure switching valve 28 has an electromagnetic pilot portion 28A conducted to the battery 31 of the vehicle through the PC relay 42 which will be described later and a return spring 28B. The pilot pressure switching valve 28 is switched between a supply position (a) and a shut-off position (b) in accordance with ON/OFF of the PC relay 42. As a result, the pilot pressure switching valve 28 is constituted to indirectly supply and shut off the pressurized oil to the hydraulic actuators 5E, 5F, 5G, 5H, 2E, 2F, and 3A by using the pilot pressure.

Specifically, when the PC relay 42 is ON, the electromagnetic pilot portion 28A is conducted, whereby the pilot pressure switching valve 28 is maintained at the supply position (a). In this case, the pilot pressure is supplied from the pilot hydraulic pump 24 to each of the hydraulic pilot valves 27. Thus, the operator can drive the desired hydraulic actuators 5E, 5F, 5G, 5H, 2E, 2F, and 3A by switching the control valve device 26 (control valves 26A to 26F) by operating the operating levers 10A and 10B and the operating levers/pedals 11A and 11B. That is, the operation of the working mechanism 5, the revolving operation of the upper revolving structure 4, and the traveling operation of the lower traveling structure 2 are enabled.

On the other hand, when the PC relay 42 is OFF, the conduction to the electromagnetic pilot portion 28A is stopped, and the pilot pressure switching valve 28 is switched to the shut-off position (b) by the return spring 28B. In this case, the pilot pressure supplied to each of the hydraulic pilot valves 27 is shut off. Thus, the control valve device 26 (control valves 26A to 26F) is maintained at a neutral position. As a result, the supply of the pressurized oil to the hydraulic actuators 5E, 5F, 5G, 5H, 2E, 2F, and 3A is shut off, and the operation of the working mechanism 5, the revolving operation of the upper revolving structure 4, and the traveling operation of the lower traveling structure 2 are disabled.

Next, constitution of an electric circuit of the hydraulic excavator 1 will be described by referring to FIG. 5.

In FIG. 5, the battery 31 is a power source for various electric equipment including the engine 15. More specifically, the battery 31 is a power source for the electric equipment for driving the engine 15 such as the starter motor 16 provided in the engine 15, the fuel injection device (injector), various sensors, and moreover, the engine control unit 43 (hereinafter referred to as an ECU 43) and the like, for example. In addition, the battery 31 is a power source for various electric equipment mounted on the hydraulic excavator 1 such as a first electrical component 37, a second electrical component 40, a monitor device 47, the vehicle body controller 48, an authentication controller 55 and the like, for example.

Here, the starter motor 16 is connected to the battery 31 through a slow-blow fuse 32 (hereinafter referred to as an SB fuse 32) called S. B. F. and the starter relay 33 and constitutes a starter circuit. The starter relay 33 is connected to the battery 31 through the SB fuse 32, a C fuse 34, a C relay 35, and a C fuse 36A in a fuse box 36 and constitutes a C-relay circuit.

The C relay 35 is switched between ON and OFF by the vehicle body controller 48 which will be described later. In this case, when the C relay 35 is turned ON, an electric current flows through the ECU 43 and the starter relay 33. Thereby, the ECU 43 turns ON the starter relay 33 and brings the starter motor 16 and the battery 31 in the conducted state. As a result, the starter motor 16 is rotated, and the engine 15 can be started. It should be noted that when the engine 15 is started, the starter relay 33 is turned OFF (open).

The first electrical component 37 is connected to the battery 31 through the SB fuse 32, an accessory fuse 38 (hereinafter referred to as an ACC fuse 38), an accessory relay 39 (hereinafter referred to as an ACC relay 39), and an ACC fuse 36B in the fuse box 36 and constitutes an accessory circuit (ACC circuit). The first electrical component 37 corresponds to electric equipment conducted to the battery 31 when the ACC relay 39 connected to the vehicle body controller 48 is ON.

The first electrical component 37 is not conducted to the battery 31 when the ACC relay 39 connected to the vehicle body controller 48 is OFF. Here, the first electrical component 37 is also called an accessory electrical component (ACC electrical component). This first electrical component 37 includes a part of the monitor device 47, a part of the controller (controllers other than the vehicle body controller 48 and the authentication controller 55, for example), an air conditioning device, a wiper, various solenoid valves and the like, for example. Moreover, the first electrical component 37 also includes electric equipment required for driving of the engine 15 such as a fuel injection device of the engine 15 and the like, for example.

On the other hand, the second electrical component 40 is connected to the battery 31 through the SB fuse 32 and a B fuse 36C in the fuse box 36. The second electrical component 40 corresponds to electric equipment connected to the battery 31 at all times regardless of ON/OFF of the C relay 35, the ACC relay 39, and the PC relay 42 connected to the vehicle body controller 48. Here, the second electrical component 40 is also called a battery directly-connected electrical component or a B electrical component. This second electrical component 40 includes a part of the monitor device 47, the vehicle body controller 48, the authentication controller 55, a horn, a light and the like, for example.

The pilot pressure switching valve 28 is connected to the battery 31 through the SB fuse 32, the pilot cut fuse 41, the PC relay 42, and a PC fuse 36D in the fuse box 36. Here, the PC relay 42 is connected to the vehicle body controller 48. The vehicle body controller 48 switches ON/OFF of the PC relay 42 in accordance with a signal of the gate lock switch 13A corresponding to the position of the gate lock lever 13.

When the PC relay 42 is ON, the pilot pressure switching valve 28 and the battery 31 are conducted, and the pilot pressure switching valve 28 is brought into the supply position (a). As a result, the pilot pressure can be supplied to the control valve device 26 (control valves 26A to 26F) through the operating levers 10A and 10B for work and the operating levers/pedals 11A and 11B for traveling, and driving of the hydraulic actuator (the swing cylinder 5E, the boom cylinder 5F, the arm cylinder 5G, the bucket cylinder 5H, the revolving hydraulic motor 3A, the traveling hydraulic motors 2E and 2F) is allowed. On the other hand, when the PC relay 42 is OFF, the pilot pressure switching valve 28 and the battery 31 are not conducted, and the pilot pressure switching valve 28 is brought to the shut-off position (b). In this case, it is a state where the pilot pressure cannot be supplied to the control valve device 26 (control valves 26A to 26F), and driving of the hydraulic actuators 5E, 5F, 5G, 5H, 2E, 2F, and 3A is prohibited.

The ECU 43 is a control device performing rotation number control and the like of the engine 15 and this ECU 43 is constituted by a microcomputer and the like, for example. The ECU 43 is connected to the various sensors and the fuel injection device (injector) provided in the engine 15. The ECU 43 operates the engine 15 at a rotation number according to the driving operation by the operator, an operating state of the vehicle and the like by variably controlling the fuel injection amount (fuel supply amount) into the cylinder of the engine 15, for example. In this case, the ECU 43 controls the fuel injection amount of the fuel injection device based on an instruction of an engine rotation number instruction dial operated by the operator and an instruction from the vehicle body controller 48, for example.

Here, the ECU 43 is connected to the battery 31 through the SB fuse 32, an ECU fuse 36E in the fuse box 36, and a main relay 44. Moreover, the ECU 43 is connected to the starter relay 33, an alternator 46, and the ACC relay 39. The main relay 44 is switched ON/OFF by the ECU 43. That is, when the ACC relay 39 is turned ON, an electric current flows from the ACC relay 39 to the ECU 43, and the ECU 43 turns ON the main relay 44. As a result, the ECU 43 is brought into the conducted state with the battery 31. Moreover, the ECU 43 is mutually connected to the monitor device 47, the vehicle body controller 48, the authentication controller 55 and the like through a communication line 45 and constitutes a CAN (Control Area Network).

The alternator 46 generates power by being driven by the engine 15. The alternator 46 supplies power to the first electrical component 37, the second electrical component 40, the ECU 43, the monitor device 47, the vehicle body controller 48, the authentication controller 55 and the like in addition to storage of electricity (charging) of the battery 31. Here, the alternator 46 has its B terminal connected to the battery 31 through the SB fuse 32, a P terminal and an I terminal connected to the ECU 43, and an L terminal connected to the monitor device 47.

The monitor device 47 is provided in the cab 8 of the hydraulic excavator 1, for example, and notifies an operation state of the hydraulic excavator 1 and the like to the operator manipulating the hydraulic excavator 1. More specifically, the monitor device 47 displays information to be notified to the operator. That is, the monitor device 47 displays information such as various state amounts including an engine rotation number, a remaining fuel amount, a remaining oil amount and the like, malfunction information, alarm information and the like of the engine 15 and various devices including hydraulic devices, for example. Moreover, as will be described later, the authenticable range of the wireless authentication device 52, and a setting screen for setting them and the like are displayed on the monitor device 47. The monitor device 47 is constituted by including a display screen, a display light, an alarm lamp, a selection switch, and a horn to be used as an acoustic device, for example. The monitor device 47 is to be used as a notifying device for notifying information to the operator.

The vehicle body controller 48 is a control device or a control unit integrally managing the monitor device 47, the ECU 43, and the authentication controller 55. The vehicle body controller 48 is constituted by including a microcomputer and the like, for example. Here, the vehicle body controller 48 switches conduction (ON) and non-conduction (OFF) between the battery 31 and the electric equipment based on the wireless authentication with the portable key device 51 performed by the wireless authentication device 52 which will be described later and the operation of the start switch 12 by the operator.

That is, the vehicle body controller 48 switches conduction and non-conduction between the battery 31 and the first electrical component 37 and conduction and non-conduction between the battery 31 and the starter motor 16 based on the authentication of the wireless authentication device 52 and the operation of the start switch 12. In other words, the vehicle body controller 48 allows or prohibits start of the engine 15 based on the result of the authentication (whether it is an authenticated state or an unauthenticated state) by the wireless authentication device 52 and presence or absence of the operation of the start switch 12.

Next, the portable key device 51 and the wireless authentication device 52 which perform wireless authentication will be described.

The portable key device 51 is also called an electronic key or a portable machine. This portable key device 51 is held by the operator operating the hydraulic excavator 1, for example. When the portable key device 51 receives a request signal (authentication request signal) transmitted from the authentication controller 55 of the wireless authentication device 52 through an LF transmission antenna 53, it transmits an ID code (authentication signal, authentication number) for authentication to the authentication controller 55.

Therefore, the portable key device 51 includes a receiver for receiving the request signal, a transmitter for transmitting the ID code to an RF reception antenna 54 of the authentication controller 55, a microcomputer for controlling them, a battery for supplying electricity to them, a transponder for which the ID code is set and the like (none of which is shown), for example. It should be noted that the transponder collates (authenticates) the ID code by being brought close to an antenna (not shown) for the transponder provided on the vehicle body when the battery of the portable key device 51 is exhausted.

Figure 6:
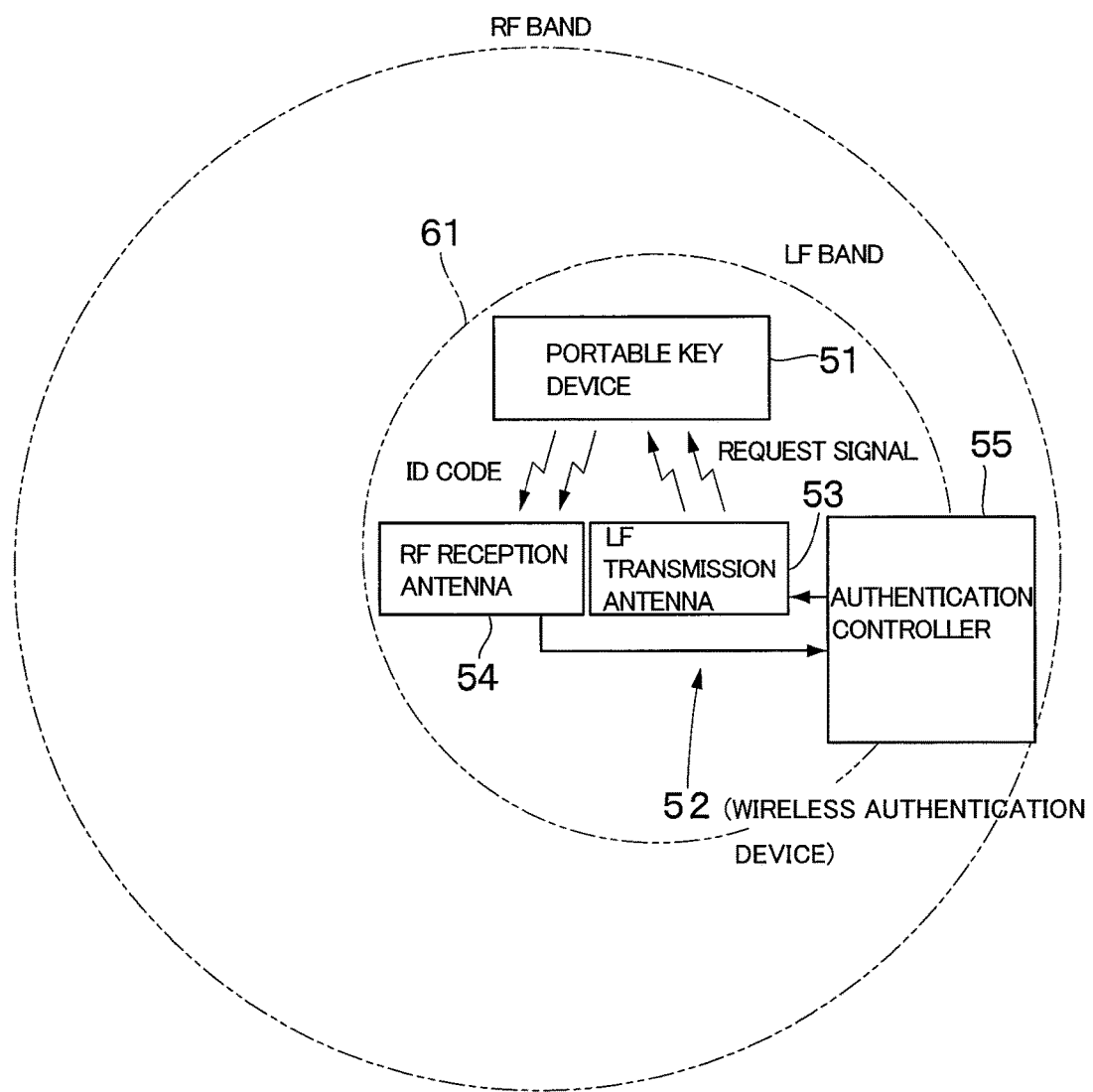
FIG. 6 is an explanatory view showing a relationship between transmission and reception between a portable key device held by an operator and a transmission antenna and a reception antenna on a hydraulic excavator side.

As shown in FIG. 6, when the portable key device 51 comes within a transmission range (LF band) of the LF transmission antenna 53 connected to the authentication controller 55, it receives the request signal (authentication request signal) transmitted from the LF transmission antenna 53 by the receiver. The portable key device 51 transmits the ID code for authentication set to the portable key device 51 through the transmitter based on this reception.

On the other hand, the wireless authentication device 52 is provided in the upper revolving structure 4 (in the cab 8, for example) which is a vehicle body side. The wireless authentication device 52 performs wireless authentication with the portable key device 51. In this case, the wireless authentication device 52 transmits the request signal in the authenticable range and performs authentication when the ID code for authentication replied from the portable key device 51 is received based on the transmitted request signal. Here, the wireless authentication device 52 is constituted by including one or a plurality of the LF transmission antennas 53 as a transmission antenna, one or a plurality of the RF reception antennas 54 as a reception antenna, and the authentication controller 55.

The LF transmission antenna 53 is connected to the authentication controller 55 and transmits the request signal indicating that the ID code for authentication is transmitted to the portable key device 51 at all times at a predetermined control cycle (0.5 second-cycle, for example). The RF reception antenna 54 is connected to the authentication controller 55 and receives the ID code transmitted from the portable key device 51.

As shown in FIG. 6, a transmission range (LF band) of the LF transmission antenna 53 is smaller than a reception range (RF band) of the RF reception antenna 54. The transmission range (LF band) of the LF transmission antenna 53 has a diameter of approximately 1 meter around the operator's seat 9, for example. On the other hand, the reception range (RF band) of the RF reception antenna 54 has a diameter of approximately 10 meters around the operator's seat 9, for example. As will be described later, the transmission range (authenticable range) of the LF transmission antenna 53 can be variably set by a range setting switch 57 within a range having a diameter of approximately 1 to 5 meters around the operator's seat 9, for example.

The authentication controller 55 is constituted by a microcomputer and this authentication controller 55 is connected to the vehicle body controller 48 through the communication line 45 and an analog signal line 56 which is a communication line different from the communication line 45. The authentication controller 55 is a control device for wireless authentication which performs wireless authentication of the portable key device 51. That is, the authentication controller 55 transmits the request signal to the authenticable range through the LF transmission antenna 53 at the predetermined control cycle (0.5-second cycle, for example). In addition, the authentication controller 55 authenticates (determines) whether or not the ID code from the portable key device 51 received through the RF reception antenna 54 is a valid ID code, that is, whether or not it matches the ID code allowed for start of the engine 15 set in advance in the authentication controller 55. The authentication controller 55 outputs an authentication result (determination result) to the vehicle body controller 48 at all times at a predetermined control cycle (0.5-second cycle, for example).

For example, when the authentication controller 55 receives a valid ID code from the portable key device 51 through the RF reception antenna 54, it determines to be valid authentication. That is, in this case, the authentication controller 55 outputs a fact (valid authentication: the fact that the portable key device 51 is within the authenticable range) that the portable key device 51 transmitting the valid ID code is present in the transmission range (LF band in FIG. 6) of the LF transmission antenna 53 to the vehicle body controller 48. On the other hand, when the authentication controller 55 has not received the valid ID code (including reception of an invalid ID code), it determines to be unauthenticated. That is, in this case, the authentication controller 55 outputs a fact that there is no portable key device 51 transmitting the valid ID code within the transmission range of the LF transmission antenna 53 (unauthentication: the fact that the portable key device 51 is not within the authenticable range) to the vehicle body controller 48.

The vehicle body controller 48 turns ON/OFF the ACC relay 39 and ON/OFF the C relay 35 based on the authentication result of the authentication controller 55 and presence or absence of the operation of the start switch 12. Therefore, the vehicle body controller 48 is constituted by including a microcomputer and the like, for example, and is connected to the authentication controller 55, the start switch 12, the gate lock switch 13A, the ACC relay 39, the C relay 35, the PC relay 42 and the like. Moreover, a range setting switch 57 which will be described later is connected to the vehicle body controller 48. The vehicle body controller 48 has a storage section (not shown) constituted by a ROM, a RAM and the like, and this storage section stores a processing program for starting or stopping the engine 15, a processing program for switching the pilot pressure switching valve 28 shown in FIG. 7, which will be described later, a processing program for setting the authenticable range shown in FIG. 8 and the like.

The vehicle body controller 48 switches ON/OFF the ACC relay 39, ON/OFF the C relay 35, and ON/OFF the PC relay 42 based on the authentication result (valid authentication or unauthentication) of the authentication controller 55, whether the start switch 12 has been operated or not, the position of the gate lock lever 13 by the gate lock switch 13A (whether it is the lock position or the unlock position) and the like.

Here, when the vehicle body controller 48 turns OFF the ACC relay 39 and turns OFF the C relay 35, a state where the engine 15 has been stopped, and the first electrical component 37 and the starter motor 16 are non-conducted (OFF), that is, the state of "engine stop/conduction OFF" can be realized.

When the vehicle body controller 48 turns ON the ACC relay 39 and turns ON the C relay 35 from the state of the "engine stop/conduction OFF" and turns OFF the C relay 35 after driving of the engine 15, a state where the engine 15 has been driven, and the first electrical component 37 is conducted (ON), that is, the state of "engine driven/conduction ON" can be realized.

On the other hand, when the vehicle body controller 48 turns ON only the ACC relay 39 from the state of the "engine stop/conduction OFF", a state where the engine 15 has been stopped, and the first electrical component 37 is conducted (ON), that is, a state of "engine stop/conduction ON" can be realized.

In the case of the "engine stop/conduction OFF", when the portable key device 51 is within the authenticable range (LF band) and the gate lock lever 13 is at the lock position (raised position) and the start switch 12 is operated, the vehicle body controller 48 switches the "engine stop/conduction OFF" to the "engine driven/conduction ON". That is, when the gate lock lever 13 is switched to the lock position, and the wireless authentication device 52 performs authentication by the portable key device 51, the vehicle body controller 48 determines that the authentication result is the valid authentication and allows start of the engine 15 by the start switch 12. When the start switch 12 is operated in this state, the vehicle body controller 48 turns ON the C relay 35, transmits an engine start signal to the ECU 43 and starts the engine 15. As described above, when the gate lock lever 13 is at the lock position and the portable key device 51 is within the authenticable range, the operator can start the engine 15 only by operating the start switch 12.

On the other hand, in the case of the "engine driven/conduction ON", when the start switch 12 is operated, the vehicle body controller 48 switches the "engine driven/conduction ON" to "engine stop/conduction OFF". That is, when the start switch 12 is operated during driving of the engine 15, the vehicle body controller 48 stops the engine 15.

Moreover, the vehicle body controller 48 turns ON/OFF the PC relay 42 based on the authentication result of the wireless authentication device 52 and the ON/OFF of the gate lock switch 13A corresponding to the position of the gate lock lever 13. Specifically, in the case where the position of the gate lock lever 13 is the lock position, that is, when the gate lock switch 13A is OFF, regardless of the authentication result of the wireless authentication device 52 (whether it is valid authentication or unauthentication), the PC relay 42 is turned OFF, and the driving of the hydraulic actuators 5E, 5F, 5G, 5H, 2E, 2F, and 3A is prohibited. That is, when the position of the gate lock lever 13 is the lock position, the vehicle body controller 48 turns OFF the PC relay 42 and brings the pilot pressure switching valve 28 to the shut-off position (b).

On the other hand, when the gate lock lever 13 is switched to the unlock position, that is, the gate lock switch 13A is ON by the operation by the operator and moreover, when the portable key device 51 is within the authenticable range of the wireless authentication device 52, the vehicle body controller 48 allows the driving of the hydraulic actuators 5E, 5F, 5G, 5H, 2E, 2F, and 3A. That is, when the gate lock lever 13 is at the unlock position and the authentication of the wireless authentication device 52 is valid authentication, the vehicle body controller 48 turns ON the PC relay 42 and brings the pilot pressure switching valve 28 to the supply position (a).

In contrast, even if the gate lock lever 13 has been switched to the unlock position, when the portable key device 51 is outside of the authenticable range of the wireless authentication device 52 (not within the authenticable range), the vehicle body controller 48 prohibits the driving of the hydraulic actuators 5E, 5F, 5G, 5H, 2E, 2F, and 3A. That is, even if the gate lock lever 13 is at the unlock position, when the authentication of the wireless authentication device 52 is unauthenticated, the vehicle body controller 48 turns OFF the PC relay 42 and brings the pilot pressure switching valve 28 to the shut-off position (b).

Here, the authentication controller 55 transmits a request signal within the predetermined authenticable range through the LF transmission antenna 53. In this case, the authenticable range (transmission range of the LF transmission antenna 53) can be variably set by a specific person (a service man, for example) performing maintenance and the like of the hydraulic excavator 1. Therefore, the range setting switch 57 as range setting means for variably setting the authenticable range of the wireless authentication device 52 is connected to the vehicle body controller 48.

The setting of the authenticable range can be made by the range setting switch 57 while the authenticable range setting screen is displayed on the monitor device 47. That is, the setting can be made by enlarging or reducing the authenticable range displayed on the screen of the monitor device 47 by using the range setting switch 57. For example, the setting can be made by enlarging or reducing a diameter around the operator's seat 9. In this case, enlargement or reduction of the authenticable range can be made by changing intensity of electric waves of the LF transmission antenna 53, for example.

In the embodiment, the wireless authentication device 52 can set the authenticable range which is an authentication range to a basic range and an expanded range wider than the basic range. As shown in FIG. 9, the authenticable range in normal time when a driving operation is performed, the range can be the basic range, that is, a range having a diameter of approximately 1 meter around the operator's seat 9, for example. In this case, when the gate lock lever 13 is at the unlock position and the operator holding the portable key device 51 is seated on the operator's seat 9 (in the cab 8), the driving of the hydraulic actuators 5E, 5F, 5G, 5H, 2E, 2F, and 3A is allowed.

On the other hand, even if the gate lock lever 13 has been switched to the unlock position, when the operator holding the portable key device 51 leaves the operator's seat 9 (not in the cab 8), the driving of the hydraulic actuators 5E, 5F, 5G, 5H, 2E, 2F, and 3A is prohibited. Here, the basic range can be selected from the ranges (A) to (I) listed below, for example. It should be noted that it is most preferable that the basic range is strictly set so as to be within the ranges of (A) to (I) below. However, the authenticable range can be enlarged or reduced some or less depending on the performance of the LF transmission antenna 53, directivity of electric waves and the like. That is, it is assumed that enlargement or reduction (enlargement or reduction within 0.5 meters, for example) of the ranges (A) to (I) listed below is allowed as long as it is a range that can suppress operation of the hydraulic excavator 1 by a person other than the operator.

(A) A range in a vertical direction as a range A (FIG. 1) from a lower end of the upper revolving structure 4 (or an upper end of the lower traveling structure 2) and above to an upper end of the cab 8 and below or within this range;

(B) A range in a left-right direction as a range of an overall width B (FIG. 2) of the lower traveling structure 2 or within this range;

(C) A range in a front-rear direction as a range of an overall length C (FIG. 2) of the lower traveling structure 2 or within this range;

(D) A range in the left-right direction and in the front-rear direction as a revolving range of the upper revolving structure 4 (a circle with a revolving radius R in FIG. 2) or within this range;

(E) A range in the vertical direction, in the left-right direction, and in the front-rear direction as a range of the operator's room 8A (cab 8) of the cab 8 or within the range (in the operator's room 8A, in the cab 8);

(F) A range in the left-right direction and in the front-rear direction as a range of a circle having a diameter of 2 meters around the operator's seat 9 or within this range (in the circle);

(G) A range in the left-right direction and in the front-rear direction as a range of a circle having a diameter of 1 meter around the operator's seat 9 or within this range (in the circle);

(H) A range in the vertical direction as a range from (a seat surface or a lower surface of) the operator's seat 9 and above to a ceiling of the cab 8 and below or within this range; and (I) A range in the left-right direction and in the front-rear direction as a range of a circumscribed circle of the seat surface of the operator's seat 9 or within this range (in the circle).

Figure 2:
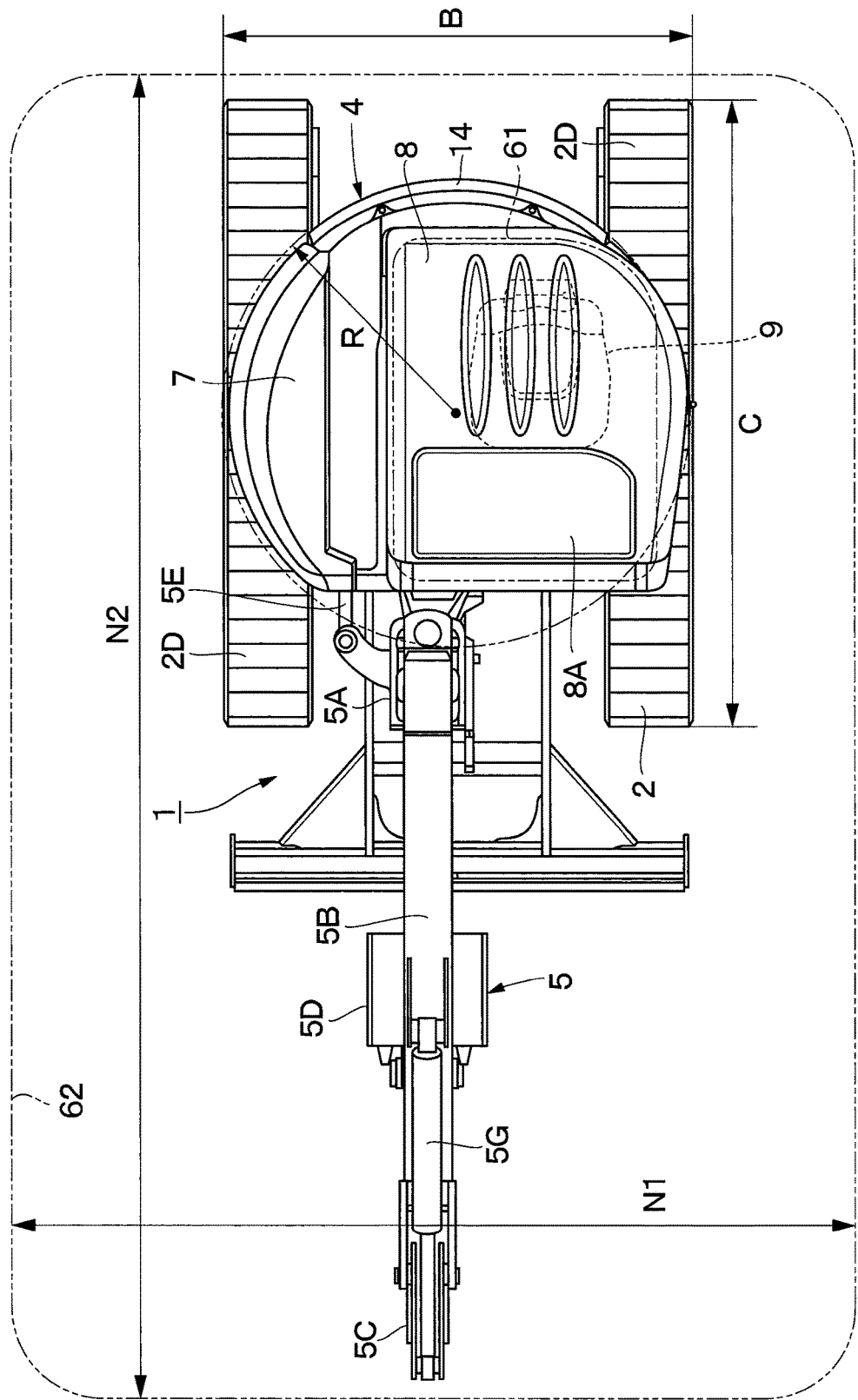
FIG. 2 is a plan view of the hydraulic excavator shown in FIG. 1.
Figure 3:
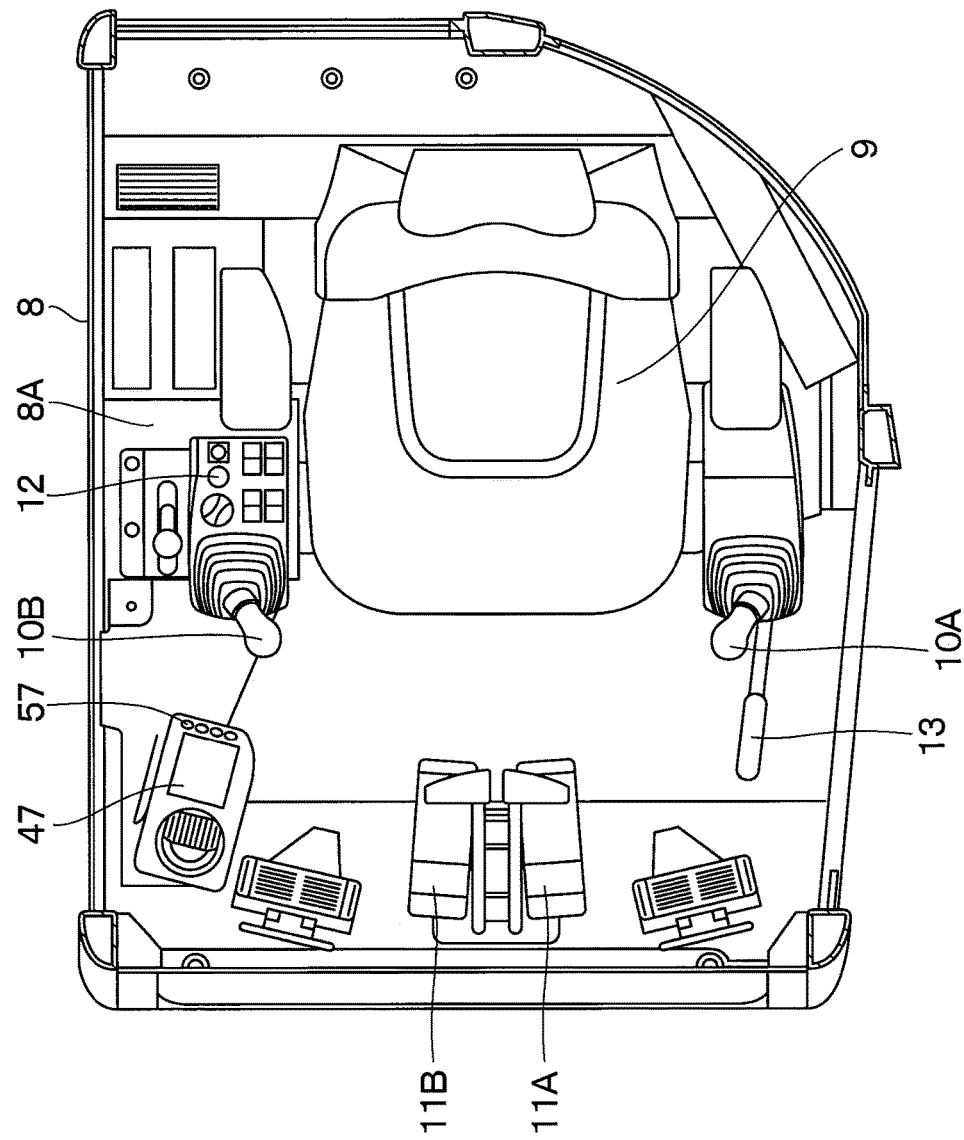
FIG. 3 is a sectional view of an inside of a cab when seen from an arrow III-III direction in FIG. 1.

In this case, the basic range can be such that a maximum range is (A) in the vertical direction, (B) in the left-right direction, and (C) in the front-rear direction, while a minimum range can be arbitrarily selected from (D) to (I). Moreover, the maximum range can be arbitrarily selected from (D) to (G) and the minimum range can be arbitrarily selected from (D) to (G) smaller than that. In FIG. 1 and FIG. 2 show the case where a basic range 61 is (E). Moreover, in FIG. 1 and FIG. 2 show the basic range 61 in a simplified manner having a substantially rectangular shape. However, the ranges having various shapes such as a circular shape, a substantially rectangular shape, a substantially polygonal shape, a composite circular shape (shape combining a plurality of circles), a fan shape, a shape combining them and the like on a top view or a side view can be used as long as an arbitrary range selected as the basic range from the aforementioned (A) to (I) is satisfied. Moreover, a plurality of separated ranges may be used. In any case, specification, performances, electric wave characteristics, a mounting position and the like of the LF transmission antenna 53 of the basic range 61 are set so as to be accommodated in an arbitrary range selected as the basic range from the aforementioned (A) to (I).

On the other hand, for maintenance of the hydraulic excavator 1, the authenticable range is set to an extended range, that is, a range larger than (A), (B), and (C) which are the maximum ranges of the basic range. For example, the authenticable range is set to a range having a diameter of approximately 5 meters around the operator's seat 9. More specifically, the extended range can be selected from the ranges (J) to (O) listed below, for example.

(J) A range in the vertical direction is set from the lower end of the lower traveling structure 2 and above to the upper end of the cab 8 and below or within this range;

(K) A range K (FIG. 1) in the vertical direction is set from the lower end of the lower traveling structure 2 and above and to the upper end of the cab 8 to which a height dimension portion of the lower traveling structure 2 is added or within this range;

(L) A range in the left-right direction larger than the overall width B of the lower traveling structure 2 (overall width B+1 meter, for example) or within this range;

(M) A range in the front-rear direction is set larger than the overall length C of the lower traveling structure 2 (overall length C+1 meter, for example) or within this range;

(N) Ranges N1 and N2 (FIG. 2) in the left-right direction and in the front-rear direction as a range capable of accommodating all of the upper revolving structure 4, the lower traveling structure 2, and the working mechanism 5 in a state where the arm 5C of the working mechanism 5 is folded on a lower side of the boom 5B or within this range; and (O) A range corresponding to a maximum value of an electric wave output allowed by laws and regulations or within this range.

In this case, the extended range can have the maximum range of (O), and the minimum range can be arbitrarily selected from (J) to (N). It should be noted that the extended range only needs to be not smaller than the basic range and partially larger than the basic range. In FIG. 1 and FIG. 2, a case in which the range in the vertical direction is (K), the range in the left-right direction is (N1), and the range in the front-rear direction is (N2) as an extended range 62 is shown. Moreover, in FIG. 1 and FIG. 2, the extended range 62 is also shown in a simplified manner having a substantially rectangular shape similarly to the basic range 61. However, the ranges having various shapes such as a circular shape, a substantially rectangular shape, a substantially polygonal shape, a composite circular shape (shape combining a plurality of circles), a fan shape, a shape combining them and the like on a top view or a side view can be used as long as a range selected as the extended range from the aforementioned (J) to (O) is satisfied. Moreover, a plurality of separated ranges may be used. In any case, specification, performances, electric wave characteristics, a mounting position and the like of the LF transmission antenna 53 of the extended range 62 are set so as to be accommodated in an arbitrary range selected as the extended range from the aforementioned (J) to (O).

When the authenticable range is to be changed from the basic range 61 to the extended range 62, the authenticable range setting screen is displayed by the range setting switch 57 on the monitor device 47. This authenticable range setting screen can be preferably displayed only by a specific person (a service man, for example) performing maintenance of the hydraulic excavator 1, for example. That is, setting of the authenticable range from the basic range 61 to the extended range 62 can be configured to require setting change limiting means such as an input of a password, connection of a computer for maintenance and the like, for example, so that only the specific person is allowed to do that. The specific person who performs the maintenance or the like has the authenticable range setting screen displayed on the monitor device 47 by inputting a password or the like and changes the authenticable range displayed in the screen to the extended range 62.

In this case, in an environment such as a repair shop or the like, for example, that is, in an environment where use by those other than a person holding the portable key device 51 is prohibited, the authenticable range is changed to the extended range. As a result, a person who performs maintenance of the hydraulic excavator 1 (a service man, for example) can drive the engine 15 and can perform a required work around the hydraulic excavator 1 in a state where the driving of the hydraulic actuators 5E, 5F, 5G, 5H, 2E, 2F, and 3A is allowed only by holding the portable key device 51. For example, an inspection in an engine room, an inspection in a radiator room, replacement of the bucket 5D of the working mechanism 5 (replacement of front attachment), slinging of a suspended load and the like can be performed. It should be noted that processing in FIG. 7 and FIG. 8 executed by the vehicle body controller 48, that is, opening/closing control processing (FIG. 7) of the pilot pressure switching valve 28 and setting processing (FIG. 8) of the authenticable range will be described later.

The hydraulic excavator 1 according to the embodiment has constitution as described above and its operation will be described subsequently.

The small-sized hydraulic excavator 1 having a machine weight of approximately 0.8 to 8 tons is conveyed to the work site in a state loaded on a loading platform of a truck. When the hydraulic excavator 1 is conveyed to the work site, the operator of the hydraulic excavator 1 gets on the cab 8 of the upper revolving structure 4 by holding the portable key device 51, for example. The operator in the cab 8 is seated on the operator's seat 9, and when the operator presses the start switch 12 in a state where the gate lock lever 13 is at the lock position, an ON signal is output. By this output of the ON signal, the vehicle body controller 48 turns ON the ACC relay 39 and also turns ON the C relay 35. When this C relay 35 is turned ON, the starter relay 33 is turned ON. Thereby, conduction to the first electrical component 37 and the starter motor 16 is started. As a result, the starter motor 16 is rotated, and the engine 15 is started. After the start of the engine 15, the vehicle body controller 48 turns OFF the C relay 35.

When the engine 15 is started, the hydraulic pump 21 is driven by the engine 15. When the operator operates the gate lock lever 13 from the lock position to the unlock position, driving of the hydraulic actuators (the swing cylinder 5E, the boom cylinder 5F, the arm cylinder 5G, the bucket cylinder 5H, the revolving hydraulic motor 3A, the traveling hydraulic motors 2E and 2F) is allowed.

For example, the operator can advance or retreat the lower traveling structure 2 by operating the operating levers/pedals 11A and 11B for traveling. The operator can perform the excavating work of earth and sand and the like by moving upward/downward the working mechanism 5 by operating the operating levers 10A and 10B for work. In this case, since the small-sized hydraulic excavator 1 has a small revolving radius by the upper revolving structure 4, a side-gutter digging work or the like can be performed while the upper revolving structure 4 is turned/driven even in a small work site such as in a street, for example. That is, the small-sized hydraulic excavator 1 can perform the demolishing work of an inside of a building, the side-gutter digging work or the excavating work of earth and sand in a small street and the like by using the working mechanism 5.

Here, the operator operates the gate lock lever 13 from the unlock position to the lock position and leaves the hydraulic excavator 1 while keeping the engine 15 driven in some cases. In this case, when the operator holding the portable key device 51 gets out of the cab 8, the portable key device 51 goes out of the authenticable range of the wireless authentication device 52 (out of the basic range 61). In this state, even if a stranger not holding the portable key device 51 other than the operator gets on the hydraulic excavator 1 with the engine 15 kept driven and operates the gate lock lever 13 to the unlock position, the driving of the hydraulic actuators 5E, 5F, 5G, 5H, 2E, 2F, and 3A can be kept prohibited.

On the other hand, when the work is finished, and the operator presses down the start switch 12, the ACC relay 39 is turned OFF by the vehicle body controller 48. As a result, conduction to the first electrical component 37 is shut off, and the engine 15 is stopped.

Figure 7:
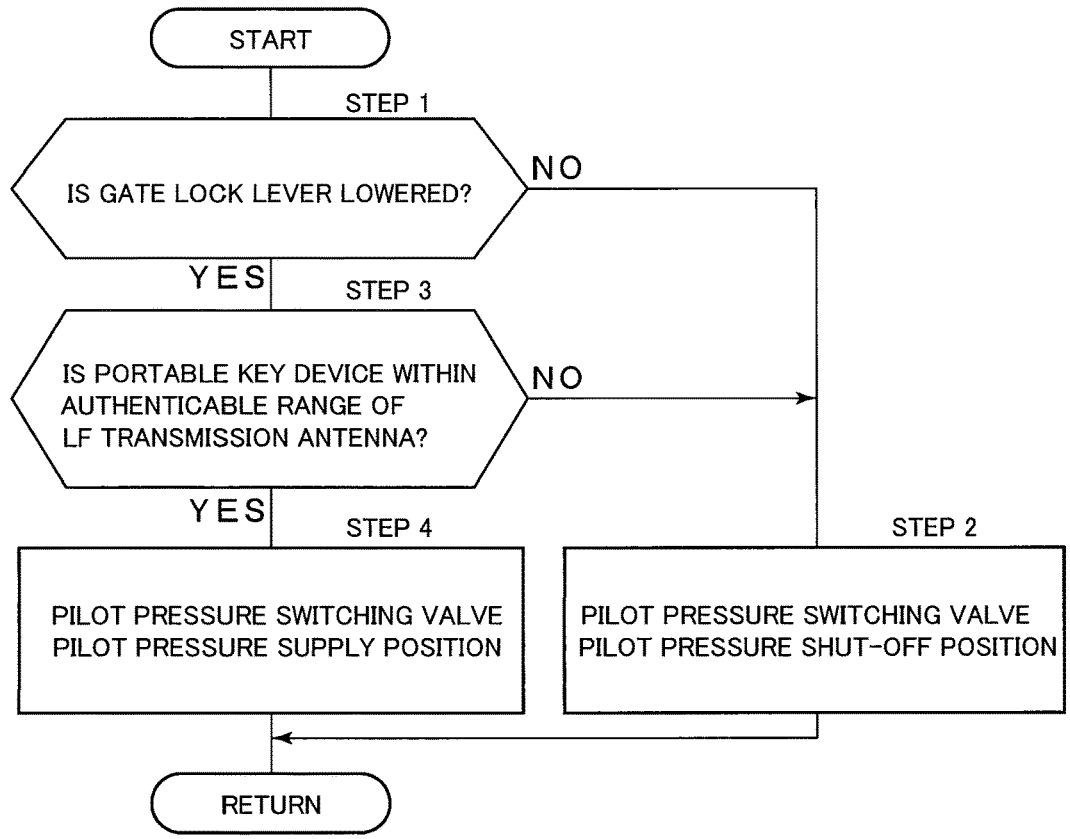
FIG. 7 is a flowchart showing control processing by a vehicle body controller in FIG. 5.
Figure 8:
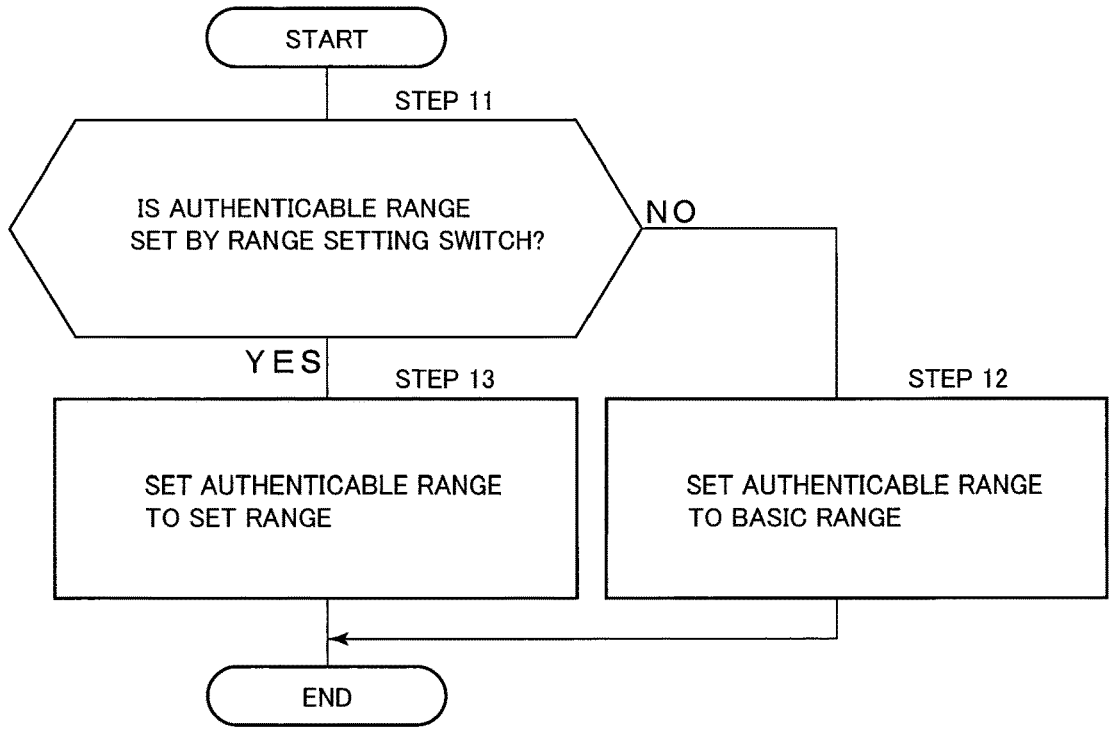
FIG. 8 is a flowchart showing setting processing of an authenticable range.

Next, the processing executed by the vehicle body controller 48 will be described by using flowcharts in FIG. 7 and FIG. 8. It should be noted that FIG. 7 is processing of switching control of the pilot pressure switching valve 28, and FIG. 8 is processing of setting the authenticable range.

First, the processing in FIG. 7 will be described. The processing operation in FIG. 7 is started when the ACC relay 39 is turned ON, that is, when a state of "engine driven/conduction ON" state is brought about. At Step 1, it is determined whether the gate lock lever 13 is at the lowered position (unlock position) or not. This determination can be made based on a signal (ON/OFF) of the gate lock switch 13A. In the case where it is determined at Step 1 to be "NO", that is, the gate lock lever 13 is not at the lowered position (unlock position) or in other words, at the raised position (lock position), the routine proceeds to Step 2. At Step 2, the PC relay 42 is turned OFF, and the pilot pressure switching valve 28 is set to the shut-off position (b). As a result, the driving of the hydraulic actuators 5E, 5F, 5G, 5H, 2E, 2F, and 3A is prohibited. When the pilot pressure switching valve 28 is set to the shut-off position (b) at Step 2, the routine returns to Start through Return, and the processing at Step 1 and after is repeated.

On the other hand, in the case where it is determined at Step 1 to be "YES", that is, that the gate lock lever 13 is at the lowered position (unlock position), the routine proceeds to Step 3. At Step 3, it is determined whether or not the portable key device 51 is within the authenticable range of the LF transmission antenna 53. This determination can be made by an authentication result output at all times at a predetermined control cycle from the authentication controller 55 to the vehicle body controller 48.

That is, in the case where the portable key device 51 is within the authenticable range of the LF transmission antenna 53, an ID code for authentication is transmitted from the portable key device 51 based on a request signal transmitted from the LF transmission antenna 53. When the authentication controller 55 receives the ID code replied from the portable key device 51 through the RF reception antenna 54, it determines whether or not this received ID code is a valid ID code.

At this time, in the case where it is a valid ID code, the authentication controller 55 output the authentication result indicating that the authenticated portable key device 51 is present within the authenticable range, that is, the fact of the valid authentication to the vehicle body controller 48. It should be noted that the authenticable range, that is, a range where the request signal is transmitted is set by the processing in FIG. 8 which will be described later. On the other hand, in the case where the valid ID code is not received, the authentication controller 55 outputs the authentication result indicating that the portable key device 51 is not within the authenticable range, that is, the fact of the unauthentication to the vehicle body controller 48.

In the case where it is determined at Step 3 to be "YES", that is, that the portable key device 51 is within the authenticable range of the LF transmission antenna 53, the routine proceeds to Step 4. At Step 4, the PC relay 42 is turned ON, and the pilot pressure switching valve 28 is set to the supply position (a). As a result, the driving of the hydraulic actuators 5E, 5F, 5G, 5H, 2E, 2F, and 3A is allowed. On the other hand, in the case where it is determined at Step 3 to be "NO", that is, that the portable key device 51 is not within the authenticable range of the LF transmission antenna 53, the routine proceeds to Step 2. As a result, since the portable key device 51 is outside of the authenticable range of the LF transmission antenna 53 even if the gate lock lever 13 is at the lowered position (unlock position), the driving of the hydraulic actuators 5E, 5F, 5G, 5H, 2E, 2F, and 3A is prohibited.

Subsequently, the processing in FIG. 8 will be described. The processing in FIG. 8 is processing executed prior to the processing at Step 1 in FIG. 7. When the processing operation in FIG. 8 is started, it is determined at Step 11 whether the authenticable range is set by the range setting switch 57 or not. In the case where it is determined at Step 11 to be "NO", that is, that the authenticable range is not set by the range setting switch 57, the routine proceeds to Step 12, the authenticable range is set to the basic range, and the processing in FIG. 8 is finished. On the other hand, in the case where it is determined at Step 11 to be "YES", that is, that the authenticable range has been set (changed) to the extended range by the range setting switch 57, the routine proceeds to Step 13, and the authenticable range is changed to the extended range. That is, the vehicle body controller 48 outputs an instruction that the authenticable range is to be changed from the basic range to the extended range to the authentication controller 55. As a result, intensity of the electric waves of the LF transmission antenna 53 is changed to the extended range. FIG. 9 shows an example of setting of the authenticable range.

As described above, according to the embodiment, on the condition that the operator holds the portable key device 51, operation of the hydraulic excavator 1 by a stranger other than the operator can be suppressed even during driving of the engine 15.

(1) That is, according to the embodiment, the vehicle body controller 48 prohibits the driving of the hydraulic actuators 5E, 5F, 5G, 5H, 2E, 2F, and 3A when the portable key device 51 is outside of the authenticable range of the wireless authentication device 52 even if the gate lock lever 13 has been switched to the unlock position. Therefore, even if the operator (himself) holding the portable key device 51 leaves the hydraulic excavator 1 during driving of the engine 15, since the portable key device 51 goes out of the authenticable range of the wireless authentication device 52, a stranger other than the operator cannot operate the hydraulic excavator 1 anymore. As a result, operation of the hydraulic excavator 1 by the stranger other than the operator holding the portable key device 51 can be suppressed.

(2) According to the embodiment, the basic range of the authenticable range of the wireless authentication device 52 can be set to (A) in the vertical direction, (B) in the left-right direction, and (C) in the front-rear direction which are the maximum ranges, respectively. In this case, even if the operator holding the portable key device 51 leaves the operator's seat 9 during driving of the engine 15, when the operator gets off the upper revolving structure 4 and also goes outside of the lower traveling structure 2, the portable key device 51 goes out of the authenticable range of the wireless authentication device 52. In this state, even if a stranger other than the operator not holding the portable key device 51 gets on the hydraulic excavator 1 during driving of the engine 15 and lowers the gate lock lever 13 to the unlock position (lowered position), the driving of the hydraulic actuators 5E, 5F, 5G, 5H, 2E, 2F, and 3A can be kept prohibited until the operator holding the portable key device 51 returns.

(3) According to the embodiment, the basic range of the authenticable range of the wireless authentication device 52 can be set to the aforementioned (D). In this case, even if the operator holding the portable key device 51 leaves the operator's seat 9 during driving of the engine 15, when the operator gets off the upper revolving structure 4, the portable key device 51 goes out of the authenticable range of the wireless authentication device 52. In this case, too, the driving of the hydraulic actuators 5E, 5F, 5G, 5H, 2E, 2F, and 3A can be kept prohibited until the operator holding the portable key device 51 returns.

(4) According to the embodiment, as the basic range of the authenticable range of the wireless authentication device 52, the minimum range can be set to the aforementioned (E), and the maximum range can be set to the aforementioned (A), (B), and (C). In this case, even if the operator holding the portable key device 51 leaves the operator's seat 9 during driving of the engine 15, if the operator is within the minimum range, when the operator gets out of the operator's room 8A, the portable key device 51 goes out of the authenticable range of the wireless authentication device 52, on the other hand, if the operator is within the maximum range, when the operator gets off the upper revolving structure 4 and also goes outside of the lower traveling structure 2, the portable key device 51 goes out of the authenticable range of the wireless authentication device 52. In this case, too, the driving of the hydraulic actuators 5E, 5F, 5G, 5H, 2E, 2F, and 3A can be kept prohibited until the operator holding the portable key device 51 returns.

(5) According to the embodiment, the authenticable range of the wireless authentication device 52 can be variably set to the basic range 61 and the extended range 62 by the range setting switch 57. Here, providing that the basic range 61 is the aforementioned (E), and when this basic range 61 is set, if the operator holding the portable key device 51 gets out of the operator's room 8A, the portable key device 51 goes out of the authenticable range of the wireless authentication device 52. Moreover, providing that the basic range is the aforementioned (A), (B), and (C), and when this basic range 61 is set, if the operator holding the portable key device 51 gets off the upper revolving structure 4 and also goes outside of the lower traveling structure 2, the portable key device 51 goes out of the authenticable range of the wireless authentication device 52. As a result, the driving of the hydraulic actuators 5E, 5F, 5G, 5H, 2E, 2F, and 3A can be kept prohibited until the operator holding the portable key device 51 returns.

On the other hand, in the environment such as in a repair factory and the like, that is, in the environment where use by those other than a person holding the portable key device 51 is prohibited, the authenticable range of the wireless authentication device 52 can be set to the extended range. For example, providing that the extended range 62 is the aforementioned (N), and when the range is changed to this extended range 62, the person holding the portable key device 51 (a service man of the repair factory, for example) can drive the engine 15 of the hydraulic excavator 1 and also perform a required work such as maintenance and the like around the hydraulic excavator 1 in the state where the driving of the hydraulic actuators 5E, 5F, 5G, 5H, 2E, 2F, and 3A is allowed.

Figure 10:
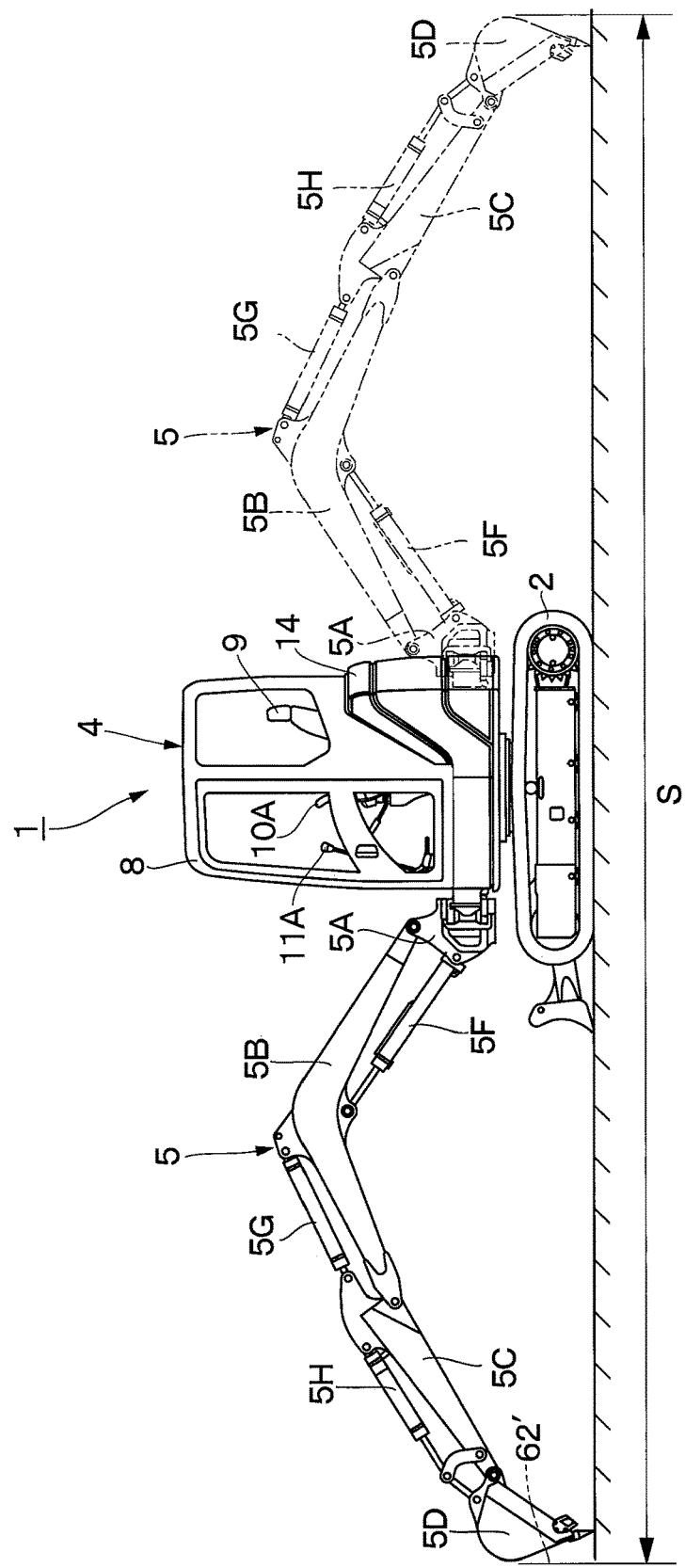
FIG. 10 is a front view showing a hydraulic excavator according to a first modification.
Figure 11:
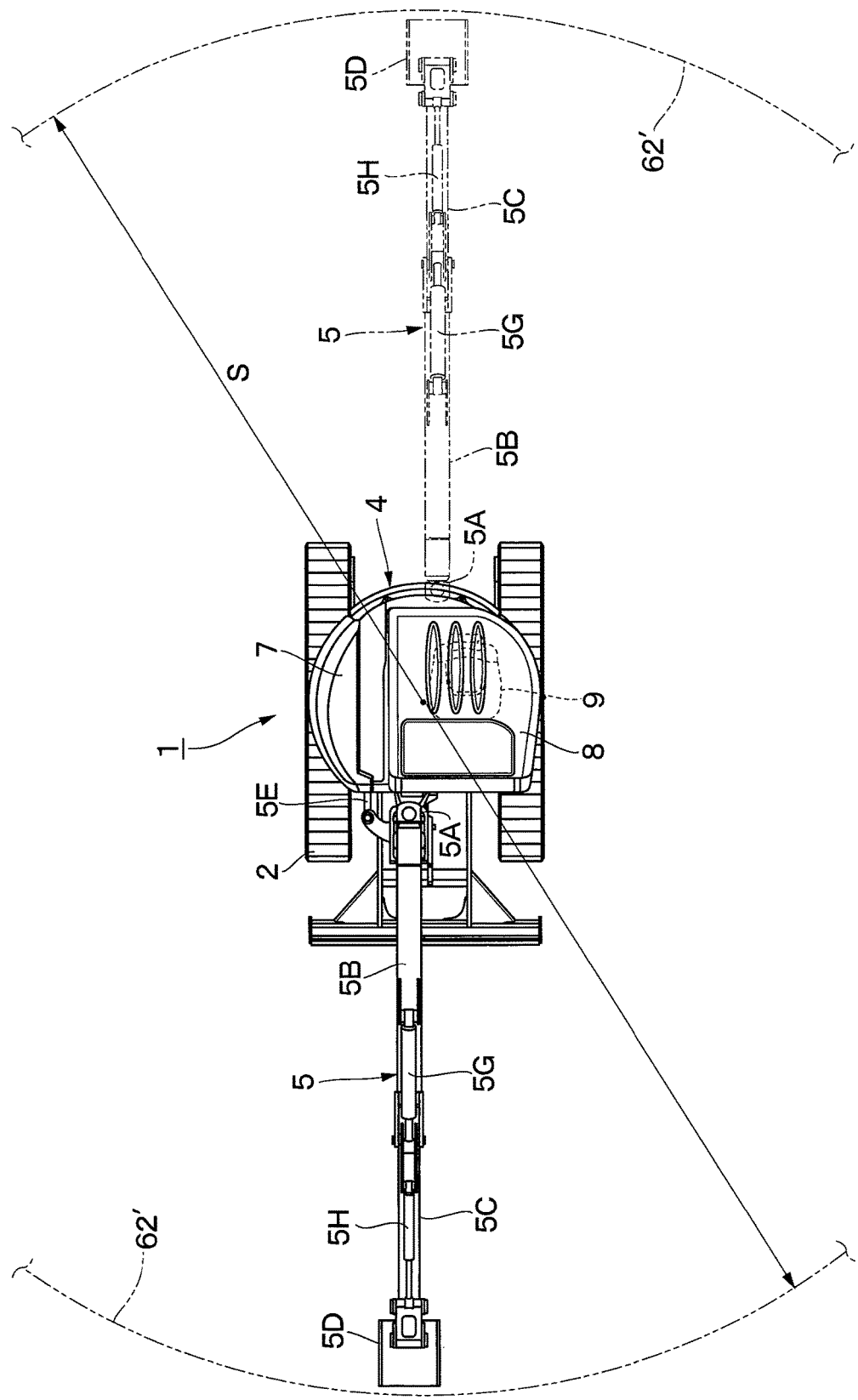
FIG. 11 is a plan view of the hydraulic excavator shown in FIG. 10.

It should be noted that in the aforementioned embodiment, the case where the extended range 62 is the ranges N1 and N2 accommodating all of the upper revolving structure 4, the lower traveling structure 2, and the working mechanism 5 in a state where the arm 5C of the working mechanism 5 is folded on a lower side of the boom 5B is described as an example. However, the present invention is not limited thereto, but as in a first modification shown in FIG. 10 and FIG. 11, for example, an extended range 62' may be a range of a range accommodating all of the upper revolving structure 4, the lower traveling structure 2, and the working mechanism 5 in a state where the arm 5C of the working mechanism 5 is extended, in other words, a working range (a circle having a working diameter S) of the hydraulic excavator 1.

Figure 12:
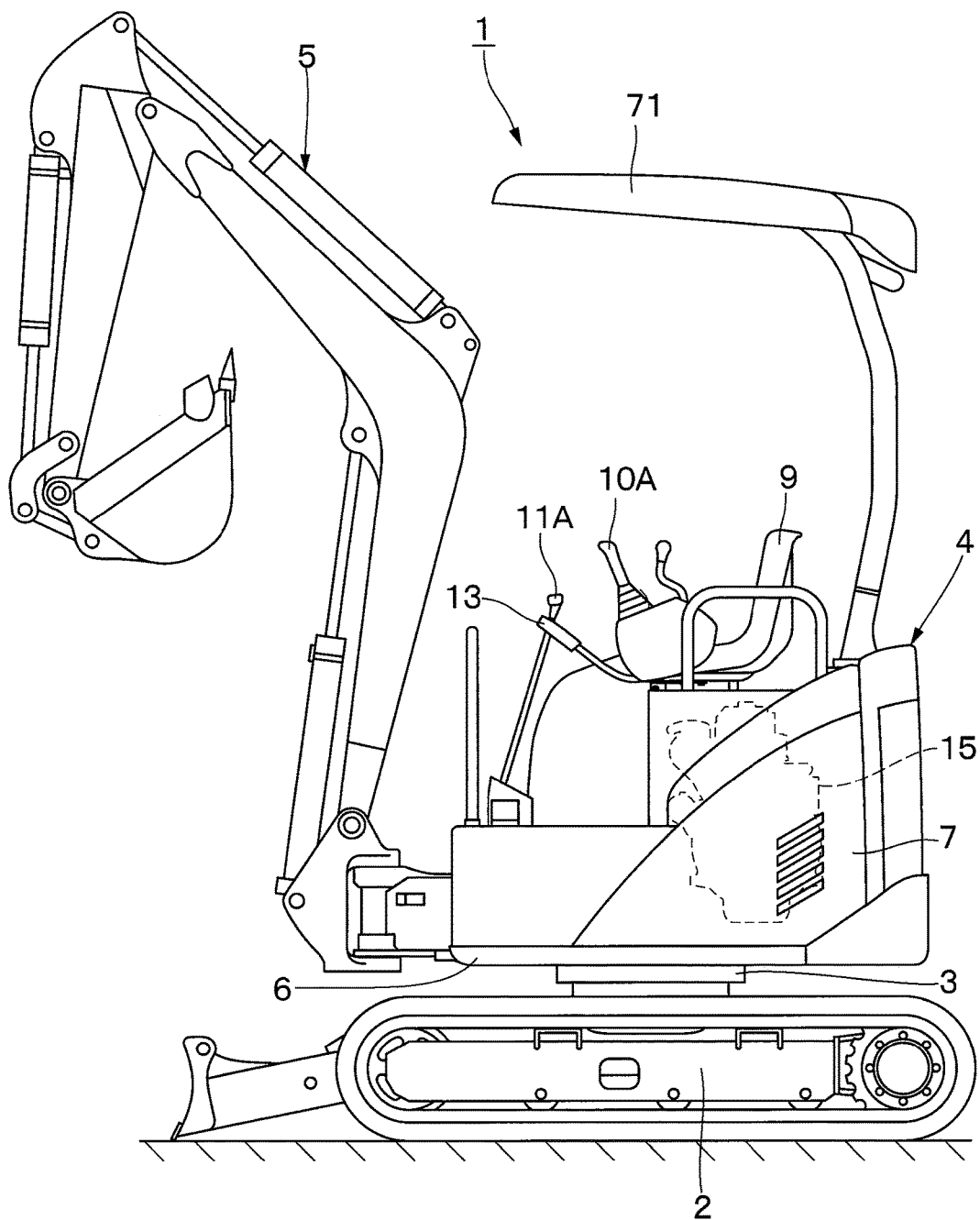
FIG. 12 is a front view showing a hydraulic excavator according to a second modification.

In the aforementioned embodiment, the case applied to the hydraulic excavator 1 with cab specification including the cab 8 as a housing on the upper revolving structure 4 is described as an example. However, the present invention is not limited thereto, but as in a second modification shown in FIG. 12, for example, the present invention may be applied also to the hydraulic excavator 1 with a canopy specification including a canopy 71 as a housing covering at least an upper part of the operator's seat 9.

In the aforementioned embodiment, the case where the authenticable range of the wireless authentication device 52 is constituted to be variably set to the basic range 61 and the extended range 62 by the range setting switch 57 is described as an example. However, the present invention is not limited thereto, but the authenticable range may be a range of either one of the basic range and the extended range, for example. That is, the range may be one selected from the aforementioned (A) to (O) and the authenticable range may be fixed (non-variable). Moreover, in the embodiment, the authenticable range is constituted to be variably set in two stages, but it may be constituted capable of setting in multiple stages of three or more stages.

In the aforementioned embodiment, the case applied to the rear super-small revolving type hydraulic excavator whose revolving radius R on the rear (counterweight 14) of the upper revolving structure is accommodated in the vehicle width of the lower traveling structure 2 is described as an example as the hydraulic excavator 1. However, the present invention is not limited thereto but may be applied to a super-small revolving type hydraulic excavator (see Japanese Patent Laid-Open No. Hei 11-336112 A, for example) where all the revolving radiuses of the upper revolving structure and the working mechanism are accommodated in the vehicle width of the lower traveling structure in a state (traveling attitude) where the working mechanism is stood to an upper revolving structure side. In this case, regarding the authenticable range, the range of the revolving radius of the upper revolving structure has substantially the same size as the range accommodating all of the lower traveling structure, the upper revolving structure, and the working mechanism.

In the aforementioned embodiment, the case where the switching valve switched in accordance with the operation of the gate lock lever 13 is the pilot pressure switching valve 28 provided in the pilot line 25 is described as an example. However, the present invention is not limited thereto, but a switching valve switched in accordance with the operation of the gate lock lever may be constituted to be provided in the main pipeline, for example. That is, as a mechanism prohibiting or allowing the driving of the hydraulic actuator in accordance with the operation of the gate lock lever, various lock mechanisms can be employed as long as the lock position where the driving of the hydraulic actuator is prohibited and the unlock position where the driving of the hydraulic actuator is allowed can be switched.

In the aforementioned embodiment, the case where the hydraulic actuator whose driving is prohibited when the gate lock lever 13 is at the lock position (raised position) is a hydraulic actuator relating to all of the work and the traveling is described as an example. However, the present invention is not limited thereto, but a hydraulic actuator whose driving is prohibited can be selected in accordance with specification of the hydraulic excavator (construction machine) and the like, for example.

In the aforementioned embodiment, the case where electrical components whose conduction and non-conduction with the battery 31 is switched in accordance with ON/OFF of the ACC relay 39 is made the first electrical component 37, an electrical component whose conduction and non-conduction is switched in accordance with ON/OFF of the C relay 35 is made the starter motor 16 of the engine 15, and an electrical component connected to the battery 31 at all times regardless of ON/OFF of the ACC relay 39 is made the second electrical component 40 is described as an example. However, the present invention is not limited thereto, but an electrical component other than the starter motor 16 may be the first electrical component whose conduction and non-conduction with the battery is switched in accordance with ON/OFF of the ACC relay, for example. Moreover, various devices corresponding to the first electrical component 37 and various devices corresponding to the second electrical component 40 in the embodiment are one exemplification and can be changed as appropriate in accordance with specification of the hydraulic excavator, optional electrical components and the like. That is, whether an electrical component is used as the first electrical component or the second electrical component can be selected in accordance with the electrical component mounted on the hydraulic excavator.

In the aforementioned embodiment, the case where the engine-type hydraulic excavator 1 including the engine 15 as a prime mover to be a driving source of the hydraulic pump 21 is described as an example. However, the present invention is not limited thereto, but may be a hybrid-type hydraulic excavator (hybrid construction machine) including an engine and an assist generator motor (a motor generator, a power generator, a motor) as a motor, for example. In this case, the assist generator motor may be the starter motor of the engine. Moreover, the prime mover may be an electric motor.

In the aforementioned embodiment, the case of being mounted on the small-sized hydraulic excavator 1 is described as an example. However, the construction machine according to the present invention is not limited thereto, but the present invention may be applied to a hydraulic excavator of a medium-size or more, for example. Moreover, in addition to a hydraulic excavator including a wheel-type lower traveling structure, the present invention can be widely applied to various construction machines such as a wheel loader, a forklift, a hydraulic crane and the like.

DESCRIPTION OF REFERENCE NUMERALS

1: Hydraulic excavator (Construction machine)
2: Lower traveling structure (Vehicle body)
4: Upper revolving structure (Vehicle body)
5: Working mechanism
5E: Swing cylinder (Hydraulic actuator)
5F: Boom cylinder (Hydraulic actuator)
5G: Arm cylinder (Hydraulic actuator)

5H: Bucket cylinder (Hydraulic actuator)
8: Cab (Housing)
9: Operator's seat
12: Start switch
13: Gate lock lever (Lock device)
15: Engine (Prime mover)
21: Hydraulic pump
28: Pilot pressure switching valve
48: Vehicle body controller
51: Portable key device
52: Wireless authentication device
57: Range setting switch (Range setting unit)

The invention claimed is:

1. A construction machine comprising:
a vehicle body having an operator's seat;
a prime mover, which is provided on said vehicle body and becomes a power source;
a hydraulic pump driven by said prime mover and supplying a pressurized oil;
a hydraulic actuator driven by the pressurized oil supplied from said hydraulic pump;
a lock device capable of switching between a lock position prohibiting the driving of said hydraulic actuator and an unlock position allowing the driving of said hydraulic actuator;
a start switch for starting said prime mover;
a wireless authentication device provided on said vehicle body and performing wireless authentication with a portable key device; and
a vehicle body controller provided for starting said prime mover based on an operation of said start switch and authentication by said wireless authentication device, wherein:
during driving of said prime mover, in the state of said lock device being switched to the unlock position, and in the case where said portable key device is within an authenticable range of said wireless authentication device, said vehicle body controller allows driving of said hydraulic actuator; and
during driving of said prime mover, in the state of said lock device being switched to the unlock position, and in the case where said portable key device is outside of the authenticable range of said wireless authentication device, said vehicle body controller prohibits driving of said hydraulic actuator while keeping said prime mover driven.

2. The construction machine according to claim 1, wherein
said vehicle body comprises an automotive lower traveling structure and an upper revolving structure rotatably mounted on said lower traveling structure and having a housing covering an upper side of said operator's seat; and
the authenticable range of said wireless authentication device has a range in a vertical direction as a range from a lower end of said upper revolving structure and above and to an upper end of said housing and below, a range in a left-right direction as a range of an overall width of said lower traveling structure, and a range in a front-rear direction as a range of an overall length of said lower traveling structure.

3. The construction machine according to claim 1, wherein
said vehicle body comprises an automotive lower traveling structure and an upper revolving structure rotatably mounted on the lower traveling structure; and
the authenticable range of said wireless authentication device is set to a revolving range of said upper revolving structure.

4. The construction machine according to claim 1, wherein
said vehicle body comprises an automotive lower traveling structure and an upper revolving structure rotatably mounted on the lower traveling structure and having a housing covering an upper side of said operator's seat;
a minimum range of an authenticable range of said wireless authentication device is a range of an operator's room of said housing; and
a maximum range of the authenticable range of said wireless authentication device has a range in a vertical direction as a range from a lower end of said upper revolving structure and above to an upper end of said housing and below, a range in a left-right direction as a range of an overall width of said lower traveling structure, and a range in a front-rear direction as a range of an overall length of said lower traveling structure.

5. The construction machine according to claim 1, further comprising:
a range setting unit for variably setting an authenticable range of said wireless authentication device to a basic range and an extended range wider than the basic range, wherein
said vehicle body comprises an automotive lower traveling structure and an upper revolving structure rotatably mounted on the lower traveling structure and on which a working mechanism is mounted;
said basic range has a range in a vertical direction as a range from a lower end of said upper revolving structure and above, a range in a left-right direction as a range of an overall width of said lower traveling structure, and a range in a front-rear direction as a range of an overall length of said lower traveling structure; and
said extended range is a range accommodating all of said lower traveling structure, said upper revolving structure, and said working mechanism.

6. The construction machine according to claim 1, wherein
said lock device includes a gate lock lever which is at a lock position where driving of said hydraulic actuator is prohibited at a raised position and at an unlock position where the driving of said hydraulic actuator is allowed at a lowered position.

* * * * *